United States Patent
Blake

(10) Patent No.: US 12,257,733 B1
(45) Date of Patent: Mar. 25, 2025

(54) CHAINSAW MILL AND MILL ATTACHMENTS

(71) Applicant: John Michael Blake, La Honda, CA (US)

(72) Inventor: John Michael Blake, La Honda, CA (US)

( * ) Notice: Subject to any disclaimer, the term of this patent is extended or adjusted under 35 U.S.C. 154(b) by 424 days.

(21) Appl. No.: 17/871,867

(22) Filed: Jul. 22, 2022

Related U.S. Application Data

(60) Provisional application No. 63/224,571, filed on Jul. 22, 2021.

(51) Int. Cl.
*B27B 17/00* (2006.01)
*B23D 57/02* (2006.01)
*B27B 17/02* (2006.01)

(52) U.S. Cl.
CPC ........ *B27B 17/0083* (2013.01); *B23D 57/023* (2013.01); *B27B 17/02* (2013.01)

(58) Field of Classification Search
CPC .......... B28D 1/08; B28D 1/082; B28D 1/084; Y10T 83/7101; Y10T 83/7145; B27B 17/02; B27B 17/0083; B27B 17/0041; B27B 17/005; B27B 7/00; B27B 3/00; B23D 57/023; B23D 57/02; B23D 57/026; B23D 51/02; B23D 51/025; B23D 51/026; B23D 51/027; B23D 51/03
USPC .................................................. 30/383, 381
See application file for complete search history.

(56) References Cited

U.S. PATENT DOCUMENTS

| | | | |
|---|---|---|---|
| 3,260,288 A * | 7/1966 | Currie | B27B 17/005 83/801 |
| 3,926,086 A * | 12/1975 | Crane | B27B 17/005 83/745 |
| 4,134,203 A | 1/1979 | Grube | |
| 4,146,962 A | 4/1979 | Grube | |
| 4,173,240 A | 11/1979 | Boyce | |
| 4,235,140 A | 11/1980 | Reece | |
| 4,244,104 A | 1/1981 | Grube | |
| 4,300,428 A | 11/1981 | Woodland | |
| 4,307,640 A | 12/1981 | Michael | |
| 4,307,641 A | 12/1981 | Shapleigh | |
| 4,351,209 A | 9/1982 | Alford | |
| 4,458,569 A | 7/1984 | Mccoubrey | |
| 4,559,858 A | 12/1985 | Laskowski et al. | |
| 4,584,918 A | 4/1986 | Stubbe et al. | |

(Continued)

FOREIGN PATENT DOCUMENTS

WO    WO 93/08967    5/1993

*Primary Examiner* — Phong H Nguyen
(74) *Attorney, Agent, or Firm* — Steven J Shattil

(57) ABSTRACT

A control system automates operations of a chainsaw mill. The chainsaw mill has at least one powerhead, and at least one travel motor that mechanically engages with a drive belt to drive the at least one powerhead along a guide track. A tension sensor measures tension on the drive belt, and a powerhead sensor produces a revolutions per minute (RPM) measurement of the at least one powerhead. A powerhead controller is responsive to the RPM measurement for controlling the powerhead's throttle to keep the RPM near a predetermined RPM setpoint. A travel motor controller is responsive to the tension measurement for controlling the at least one powerhead's transit speed along the guide track to maintain drive-belt tension near a predetermined tension setpoint.

20 Claims, 12 Drawing Sheets

(56) References Cited

U.S. PATENT DOCUMENTS

| | | |
|---|---|---|
| 4,640,170 A | 2/1987 | Bakken |
| 4,711,032 A | 12/1987 | Rickmers et al. |
| 4,726,274 A | 2/1988 | Pitoni et al. |
| 4,780,818 A | 10/1988 | Kubo |
| 4,858,325 A | 8/1989 | Miller |
| 4,937,943 A | 7/1990 | Nieminen |
| 5,078,119 A * | 1/1992 | Holmes .................. B27B 17/14 |
| | | 125/21 |
| 5,213,022 A * | 5/1993 | Elgan ..................... B23D 53/04 |
| | | 83/803 |
| 5,243,892 A | 9/1993 | Jindra |
| 5,427,007 A | 6/1995 | Bystrom |
| 5,568,756 A | 10/1996 | Peterson |
| 5,746,262 A | 5/1998 | Baumgartner |
| 5,784,941 A | 7/1998 | Sanborn |
| 5,797,437 A | 8/1998 | Beeson |
| 6,192,592 B1 | 2/2001 | Zimmerman |
| 6,286,905 B1 * | 9/2001 | Kimura ................. B28D 1/082 |
| | | 299/73 |
| 6,408,906 B1 | 6/2002 | Moon et al. |
| 6,904,687 B1 | 6/2005 | Hill |
| 7,360,289 B2 | 4/2008 | Fishburn |
| 7,860,481 B2 | 12/2010 | Walker et al. |
| 7,878,098 B2 | 2/2011 | Wallace |
| 7,882,773 B2 | 2/2011 | Wallace |
| 7,966,713 B2 | 6/2011 | Burton et al. |
| 8,181,559 B1 | 5/2012 | Ende |
| 8,261,645 B2 | 9/2012 | Dale |
| 8,261,647 B2 | 9/2012 | Dale |
| 8,276,493 B2 | 10/2012 | Dale |
| 8,479,628 B2 | 7/2013 | Dale et al. |
| 8,528,217 B2 | 9/2013 | Kondo et al. |
| 8,820,727 B2 | 9/2014 | Dale |
| 8,979,084 B2 | 3/2015 | Lucas |
| 9,102,074 B2 | 8/2015 | Dale |
| 9,133,669 B1 | 9/2015 | Streety et al. |
| 9,676,116 B2 | 6/2017 | Dale |
| 9,815,220 B2 | 11/2017 | Madson |
| 9,844,824 B2 | 12/2017 | Fuchs |
| 10,245,662 B2 | 4/2019 | Jönsson |
| 10,315,327 B2 | 6/2019 | Byström |
| 10,391,568 B2 | 8/2019 | Fuchs |
| 10,478,992 B2 | 11/2019 | Steciak, Jr. |
| 10,500,656 B2 | 12/2019 | Lutz et al. |
| 10,730,200 B2 | 8/2020 | Wheeler |
| 10,830,317 B1 | 11/2020 | Granberg et al. |
| 10,857,693 B2 | 12/2020 | Barber |
| 2012/0037276 A1 | 2/2012 | Granberg et al. |
| 2013/0306047 A1 * | 11/2013 | Jonsson .................. F16D 7/025 |
| | | 125/21 |
| 2015/0273722 A1 | 10/2015 | Madson |
| 2017/0120354 A1 * | 5/2017 | Jönsson ................. B23D 57/02 |

\* cited by examiner

CHAINSAW MILL AND MILL ATTACHMENTS

CROSS REFERENCE TO PRIOR APPLICATIONS

This application claims the priority benefit of U.S. Provisional Pat. Appl. No. 63/224,571, filed on Jul. 22, 2021; which is hereby incorporated by reference herein in its entirety.

BACKGROUND

I. Field

Aspects of the present disclosure relate to a chainsaw mill for cutting timber.

II. Background

Chainsaw milling isn't like normal chainsaw use. It takes a long time, and because it typically involves cutting flat grain, much finer dust is produced. The operator is exposed to fine dust, chainsaw fumes, loud noise, and vibration for a very long time.

As milling proceeds, it is necessary to insert wedges into the kerf to keep the top slab of the log from pinching the chain. For a single-head mill with one operator or a dual-head mill with two operators, this requires controlling the mill with only one hand while also providing even pressure on the mill.

Achieving a smooth cut with few kerf marks requires maintaining a consistent mill feed force throughout the duration of the cut. This involves providing uniform pushing tension on the chain-bar assembly, maintaining a consistent angle of the saw throughout the cut, and avoiding stopping the saw mid-cut.

To obtain planar cuts and cuts of standard dimensions it is essential that the log being cut be rendered immovable; that the chainsaw be drawn smoothly through the log without lateral pressure; and that the chainsaw be moved without deviation relative to the guide member.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

A chainsaw mill assembly can comprise a chainsaw bar to guide a cutting chain, at least one motor to drive the cutting chain, and a mill frame, or gantry, that holds the chainsaw and is configured to transit a guiding surface or a track (e.g., a ladder). Furthermore, an electronic winch or a travel motor might be configured to drive the chainsaw mill assembly along the guiding surface or track/ladder. The chainsaw mill might comprise a wireless receiver configured to receive a wireless remote control signal from a wireless user device. An actuator system is coupled to the wireless receiver, and provides control to each chainsaw powerhead's throttle and the electronic winch or travel motor. The actuator system can be configured to control the throttle(s) and the electronic winch (or travel motor) in accordance with the wireless remote control signal transmitted by the wireless user device.

In some aspects, a second power source that is separate from the chainsaw powerhead(s) can be used to power the winch or travel motor. The second power source might provide power to other components described herein, such as the wireless receiver and the actuator system. In one example, the second power source can be a lithium battery.

The throttle can have multiple preset (e.g., discrete) throttle levels (e.g., positions) and/or a continuous range of throttle levels. The actuator system can select any one of a set of discrete throttle levels (such as in response to the wireless remote control signal) and adjust the motor's throttle accordingly. The actuator system can control powerhead throttle over a range of discrete throttle levels and/or continuous range(s) of throttle settings. In one example, the wireless signal received by the wireless system indicates a discrete throttle level, and the actuator system can respond to the discrete throttle level by tuning the throttle directly to the discrete throttle level, or the actuator system can provide a continuous adjustment to the throttle until the discrete throttle level is reached. A user interface or machine interface for communicating throttle-control instructions to the actuator system may be configured to allow a selection of discrete throttle levels and/or any level within a continuum (e.g., a continuous range) of values. The receiver or actuator system might reconfigure a throttle-control instruction, such as from a first level to a second level, or otherwise adapt the instruction for controlling the motor's throttle.

In some instances, a computer processor in the actuator system receives sensor information in addition to throttle-control instructions that are received via a machine interface and/or user interface. The computer processor can be programmed to adjust or limit the throttle based on the sensor information, wherein the sensor information indicates operating conditions and/or operating parameters of the sawmill. For example, the computer processor may set a range of selectable throttle levels based on the received sensor information, the range defining boundaries of operation, and the computer processor can be responsive to throttle-control instructions by adapting the throttle-control instructions to be within the boundaries of operation.

In another example, an apparatus that can be attached to a chainsaw mill can comprise an electronic winch or travel motor configured to pull a chainsaw mill assembly along a guiding surface, a wireless receiver configured to receive a wireless remote control signal from a wireless user device, and an actuator system that is communicatively coupled to the wireless receiver and the electronic winch. The actuator system can be mechanically and/or electronically configurable to control a powerhead throttle. The actuator system might be responsive to the wireless remote control signal for controlling the throttle and the electronic winch (or travel motor).

A method for remotely operating a chainsaw mill can comprise selecting, via a wireless communication device, a powerhead throttle position and a travel speed for pulling a chainsaw mill assembly along a guiding surface or track/ladder. The wireless device transmits a throttle control signal and a travel speed and/or speed direction control signal. The throttle control signal corresponds with the selected throttle position, the travel speed control signal corresponds with the selected speed of the mill frame/gantry, and the travel direction corresponds with the desired direction of travel (e.g., forward or backward) of the mill frame/gantry. A wireless receiver on the chainsaw mill assembly receives the throttle control signal and the travel speed control signal, and a microprocessor on the chainsaw mill adjusts the throttle and the travel speed accordingly.

According to some aspects of the disclosure, a chainsaw mill comprises a chainsaw, comprising a chainsaw bar to guide a cutting chain, and at least one powerhead to drive the cutting chain, the at least one motor comprising at least one throttle. A gantry is configured to hold the chainsaw and transit along a guide track. The guide track comprises two ends, and a drive belt attached at one or both of the two ends. A travel motor can be attached to the gantry and configured to engage with the drive belt for driving the gantry along the guide track. A control system is configured to automate control of the at least one powerhead and the travel motor by keeping drive-belt tension and powerhead revolutions per minute (RPM) within predetermined specifications.

The control system can comprise at least one tension sensor communicatively coupled to the control system and configured to provide a drive-belt tension measurement to the control system; and at least one RPM sensor communicatively coupled to the control system and configured to provide an RPM measurement to the control system.

By way of example, but without limitation, the control system might employ a drive-belt tension setpoint and an RPM setpoint, and might be configured to set or adjust at least one of the travel motor's speed control (e.g., in an electric motor, the speed control might adjust power supply current to the motor to regulate the motor's speed) and the at least one powerhead's speed control (e.g., via a throttle, power supply current, RPM controller, or other motor speed controller). In some aspects, the control system comprises at least one proportional-integral-derivative controller. The control system might be further configured to damp effects of at least one of travel motor control on powerhead control or powerhead control on travel motor control.

In one example, a control system is provided for a chainsaw mill that comprises at least one powerhead and at least one travel motor configured to mechanically engage with a drive belt to drive the at least one powerhead along a guide track. The control system comprises at least one tension sensor configured to produce a tension measurement of tension on the drive belt; at least one powerhead sensor configured to produce a RPM measurement of the at least one powerhead, or to produce a chain speed measurement of a cutting chain being driven by the at least one powerhead; a powerhead controller configured for, in response to the RPM measurement or the chain-speed measurement, controlling the powerhead's throttle to keep the RPM or the chain speed within a predetermined range; and a travel motor controller configured for, in response to the tension measurement, controlling the at least one powerhead's transit along the guide track to maintain drive-belt tension within a predetermined range.

In another example, an apparatus configured to operate with a chainsaw mill is provided. The apparatus comprises at least one processor and at least one memory in electronic communication with the at least one processor. The at least one memory (such as a non-transitory computer-readable memory) has instructions stored therein (such as code in a computer program) which are executable by the at least one processor to receive a tension measurement of tension on a drive belt resulting from a drive force exerted by a travel motor mechanically engaged with the drive belt and configured to drive at least one powerhead along a guide track; receive an RPM measurement of the at least one powerhead, or receive a chain speed measurement of a cutting chain being driven by the at least one powerhead; in response to the RPM measurement or the chain-speed measurement, control the at least one powerhead's throttle to keep the RPM or the chain speed within a predetermined range; and in response to the tension measurement, control a travel motor to control transit of the at least one powerhead along the guide track to maintain drive-belt tension within a predetermined range.

Methods for operating any of the chainsaw mills, control systems, devices, and/or processors disclosed herein are hereby included. Some aspects comprise configuring any of the chainsaw mills, control systems, devices, and/or processors to perform one or more of the methods disclosed herein. In some aspects, disclosed methods might be performed by at least one computer processor and/or electronic circuit configured to perform the method(s). In some aspects, one or more non-transitory computer-readable memories might have program code stored thereon, which, when executed by one or more computer processors, performs one or more methods disclosed herein. Disclosed aspects include methods for making (e.g., designing, manufacturing, assembling, connecting) any of the chainsaw mills, mill components, control systems, devices, non-transitory computer-readable memories, and/or processors disclosed herein.

The term "configure" or "configuring" or "configured" conveys one or more steps or processes that cause one or more configurable elements to perform a disclosed function. This might include making the one or more configurable elements. By way of example, configurable elements, such as hardware, firmware, and/or software, can be configured to perform the disclosed function(s). A configurable element might be a circuit, a computer processor, software and/or firmware, a system, or combination thereof. Making the one or more configurable elements might comprise designing, manufacturing, assembling, connecting (e.g., physically connecting or communicatively connecting), and/or instructing the one or more configurable elements to perform the disclosed function(s). In one instance, an electronic circuit is configured to perform the disclosed function(s) by designing the circuit, manufacturing the circuit, and/or connecting circuit components. Such an electronic circuit might be an application-specific integrated circuit (ASIC), microprocessor, digital signal processor, computer processing unit, graphics processing unit, field programmable gate array, microcontroller, or some other electronic circuit. In one instance, one or more computer processors might be configured to perform the disclosed function(s), which might include one or more steps or processes, such as writing instructions in computer program code, assembling pre-written code modules, linking to a library of software functions and/or objects, storing the code in memory, reproducing computer program code, distributing the code over a network, compiling the code into an executable program, storing the executable program in memory, linking to another executable program, loading the executable program into a processing system, causing the executable program to run, and/or provisioning hardware, network, and/or software resources to run the executable program. The one or more computer processors might include a computer processing unit (CPU), a graphics processing unit (GPU), a digital signal processor (DSP), a baseband unit (BBU), a modem, a microprocessor, a microcontroller, a general purpose processor (GPP), and/or a field-programmable gate array (FPGA).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

The term "log" is meant to include any piece of wood, including, but not limited to, tree trunks, tree stumps, burls, wood slabs, wood blocks, or tree roots.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The description that follows includes exemplary systems, methods, techniques, instruction sequences, and computer program products that embody techniques of this disclosure. However, it is understood that the described aspects may be practiced without these specific details. Apparatuses and methods are described in the following description and illustrated in the accompanying drawings by various blocks, modules, components, circuits, steps, processes, algorithms, etc. (collectively referred to as "elements"). These elements may be implemented using electronic hardware, computer software, firmware, or any combination thereof.

Figure 1A:
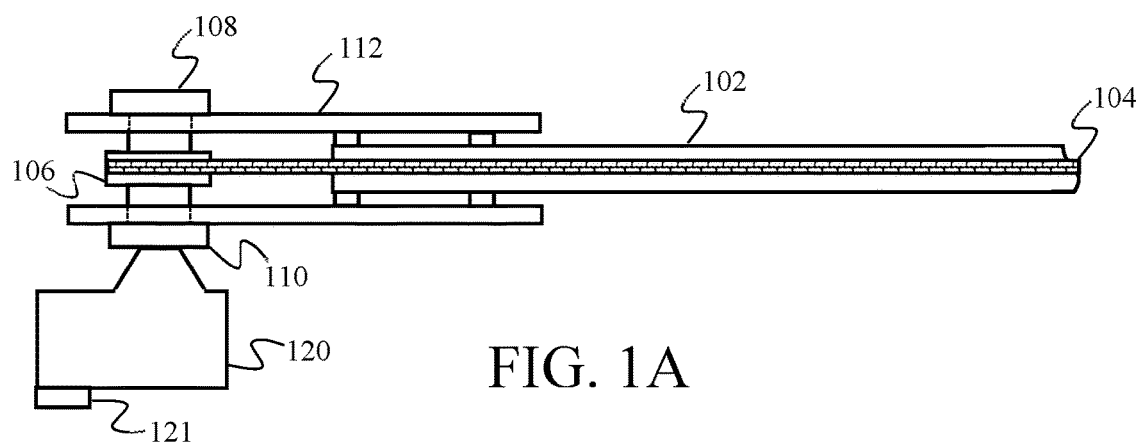
FIGS. 1A and 1B illustrate components that are part of a chainsaw mill according to some aspects of the disclosure.

FIG. 1A is a sideview illustration of components that are part of a chainsaw mill according to some aspects of the disclosure. In this illustration, the chainsaw mill is configured to cut a horizontal slab from a log. A chainsaw bar 102, such as a single-ended or double-ended bar, guides a cutting chain 104, such as a ripping chain. A rim gear 106 drives the chain 104, and is held in place by a frame 112 via top and bottom bearings, 108 and 110. A chainsaw motor 120 provides power to turn the rim gear 106. An actuator 121 is responsive to a wireless signal transmitted by a wireless controller (not shown) to control one or more mechanical functions of the motor 120, enabling the human operator to operate the chainsaw mill from a distance.

The chainsaw motor 120 can be a gasoline motor or an electrical motor. In one instance, the chainsaw motor 120 is an electric brushless motor. For example, the V807 170 KV motor by Tiger Motor can drive a 21 kg thrust with 6800 Watts of power at 100% throttle. A 9000 Watt electric motor is likely to be more than sufficient for most chainsaw milling uses. Electric motors can be substantially lighter than gasoline motors, and offer many other advantages over gasoline motors, particularly when the mill needs to be transported to remote locations where power is unavailable and the terrain is uneven. Some applications might employ, for example, a C6374 170 KV Efficiency Brushless Belt Sensored Motor for Electric Skateboard Longboarding. Some applications might employ a larger motor, such as an electric dirt bike motor.

The chainsaw mill can comprise a power source and/or power cables to power the electric motor 120 and/or recharge the motor's battery. Line power and/or a renewable power source can recharge a battery used by the motor 120. For example, a portable solar-power generator might be employed. The motor 120 and/or a battery charger for the motor can comprise electrical cables configured to connect to the battery of a truck, tractor, car, or other vehicle.

Figure 1B:
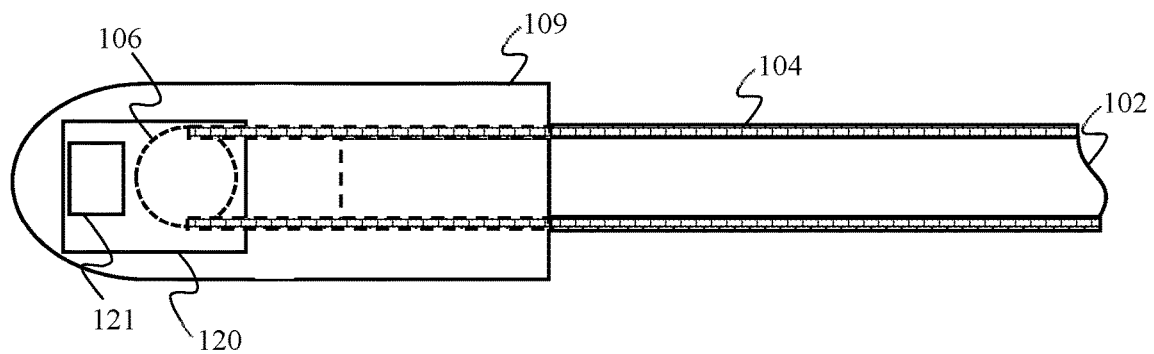

FIG. 1B is a corresponding top view of the chainsaw mill shown in FIG. 1A. A housing 109 can surround or contain the frame 112 and other features of the chainsaw. The chainsaw bar 102 comprises a far end that is not shown in FIGS. 1A and 1, which may comprise a second powerhead (e.g., chainsaw motor) or a helper handle. The chainsaw mill can comprise an apparatus to adjust chain tension. In one example, the helper handle has an adjustable chain roller. The chainsaw can be configured to attach to a mill frame. For example, the bar 102, frame 112, and/or housing 109 can comprise mounts, bolts, brackets, and/or other feature that enable connection to the mill frame.

The actuator 121 can be responsive to a wireless signal transmitted by a sensor or a human-operated wireless controller to electronically and/or mechanically control one or more functions of the chainsaw mill. The functions can include powering up (e.g., turning on) the chainsaw(s), powering down (e.g., turning off) the chainsaw(s), adjusting throttle, and/or adapting winch function. In some instances, the actuator 121 might comprise a microprocessor or microcontroller circuit that is configured to produce an electronic control signal in response to a particular sensor reading or combination of sensor readings. The control signal is then communicated to an electronic or electro-mechanical device that controls at least one of the chainsaw mill's operations. The electronic or electro-mechanical device then selects and/or adapts the operation(s) as directed in accordance with the control signal. In some instances, the actuator 121 can generate electronic control signals and/or cause a mechanical action that adjusts at least one of the chainsaw's functions, such as in response to the wireless signal transmitted by the wireless controller.

Figure 2A:
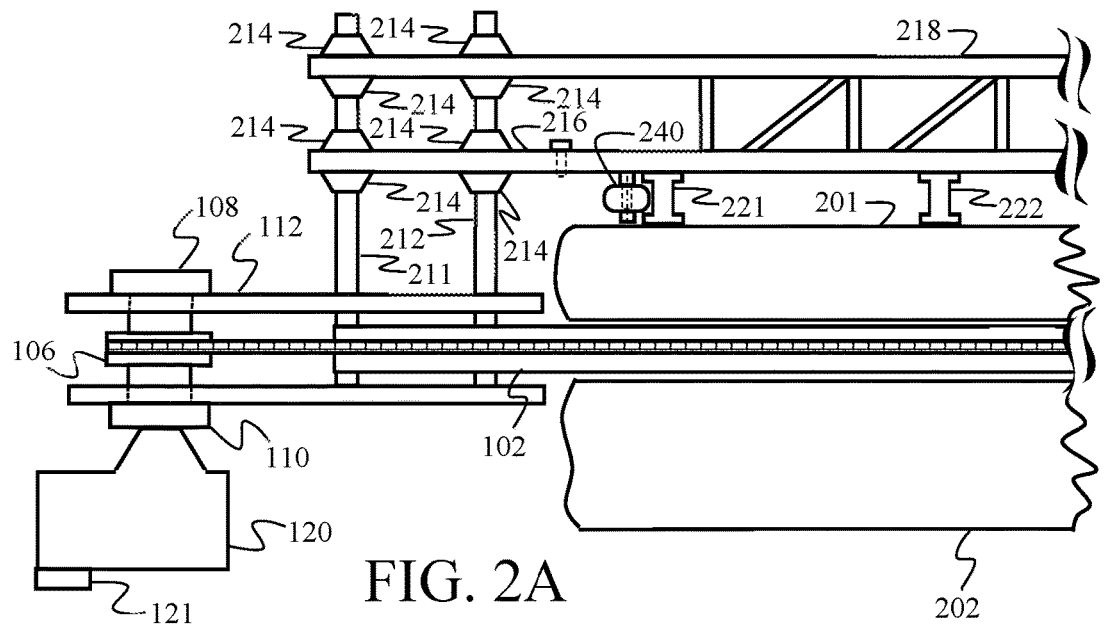
FIGS. 2A and 2B illustrate components that are part of a chainsaw mill according to other aspects of the disclosure.

FIG. 2A illustrates a side view of a chainsaw mill according to one possible aspect of the disclosure. The bar 102, frame 112, and/or housing 109 might be connected to a mill frame that provides vertical and horizontal adjustment of the cut through a log, depicted here as comprising a horizontal slab 201 and a base 202. Vertical supporting members 211 and 212 can attach the chainsaw to at least one part of a gantry (also referred to as a mill frame), shown here as comprising horizontal members 216 and 218. Adjustable attachment fittings 214 can provide for vertical and/or horizontal adjustment of the chainsaw relative to the gantry. The gantry (e.g., horizontal member 216) rests upon a guiding surface, such as a track or ladder comprising two or more rails 221 and 222. The rails 221 and 222 might be adjustable for providing level control of the guiding surface. The rails 221 and 222 can be affixed to the log 202 via brackets (not shown). A carriage or rollers (not shown) might be employed to move the gantry across the guiding surface. As shown in the FIG. 2A, vertical positioning of the chainsaw relative to the gantry via adjustment along the vertical supporting members 211 and 212 can be performed to select the thickness of the slab 201. The width of the gantry, the placement of rails 221 and 222, and the number of rails can be adjustable according to the dimensions of the log to be cut.

Figure 2B:
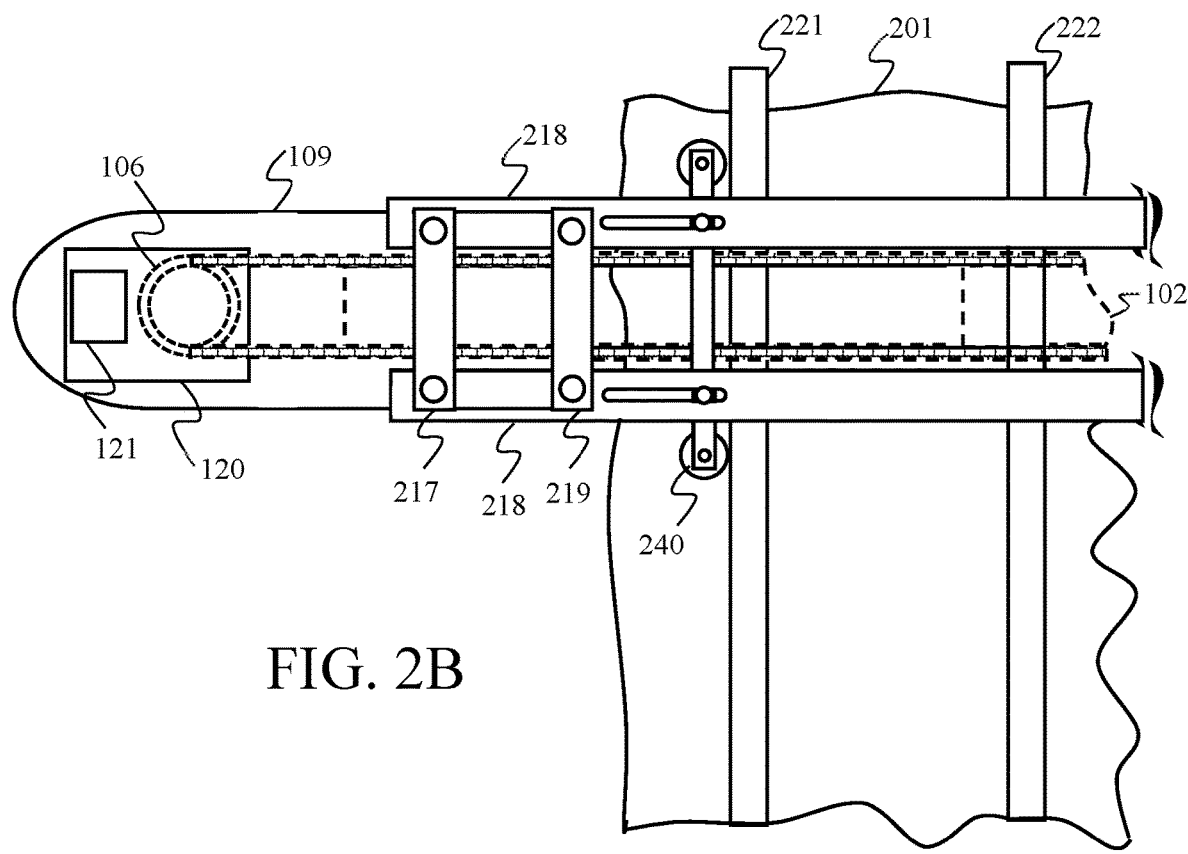

FIG. 2B shows a top view of the chainsaw mill shown in FIG. 2A. The gantry (e.g., depicted here as the visible top members 218) moves along the rails 221 and 222, which rest on the top surface of the slab 201, and the chainsaw cuts a predetermined distance below the slab 201. Crossbar members 217 and 219 provide horizontal structural support to the gantry. In other aspects, the chainsaw mill can be configured to guide the chainsaw bar in a vertical cutting position. The chainsaw mill can be adaptable to enable other cutting orientations as well.

While the rails 221 and 222 can function as a straight edge for guiding the cut, alternatively, after the first cut, the freshly cut surface can be used as a guide. An advantage to using the rails 221 and 222 after the first cut is that if the rails 221 and 222 are set to overlap both ends of the log, the chainsaw mill will start the cut with most or all of the mill in contact with the guiding surface, and will finish the cut while mostly or completely in contact with a stable surface.

Figure 3A:
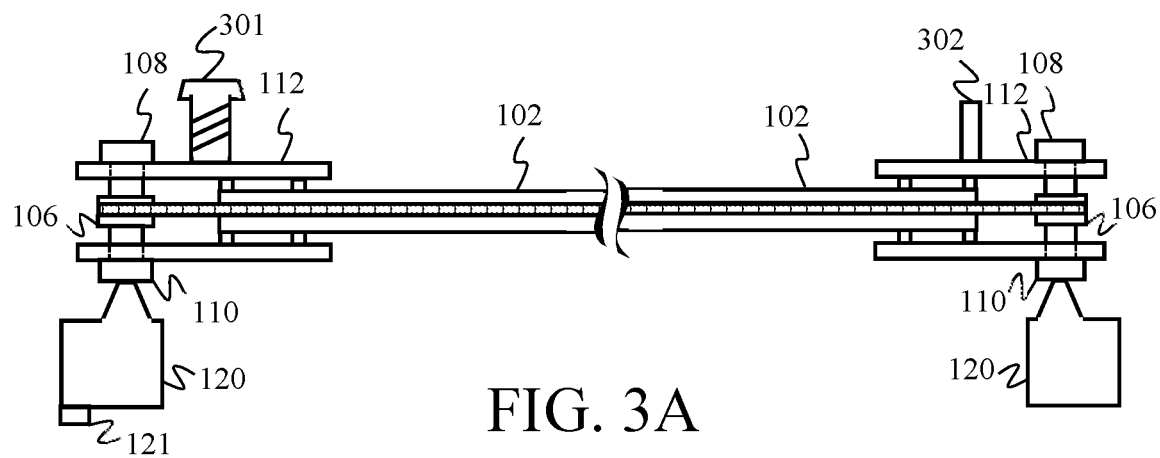
FIGS. 3A and 3B illustrate components of a chainsaw mill configuration that employs two powerheads.
Figure 3B:
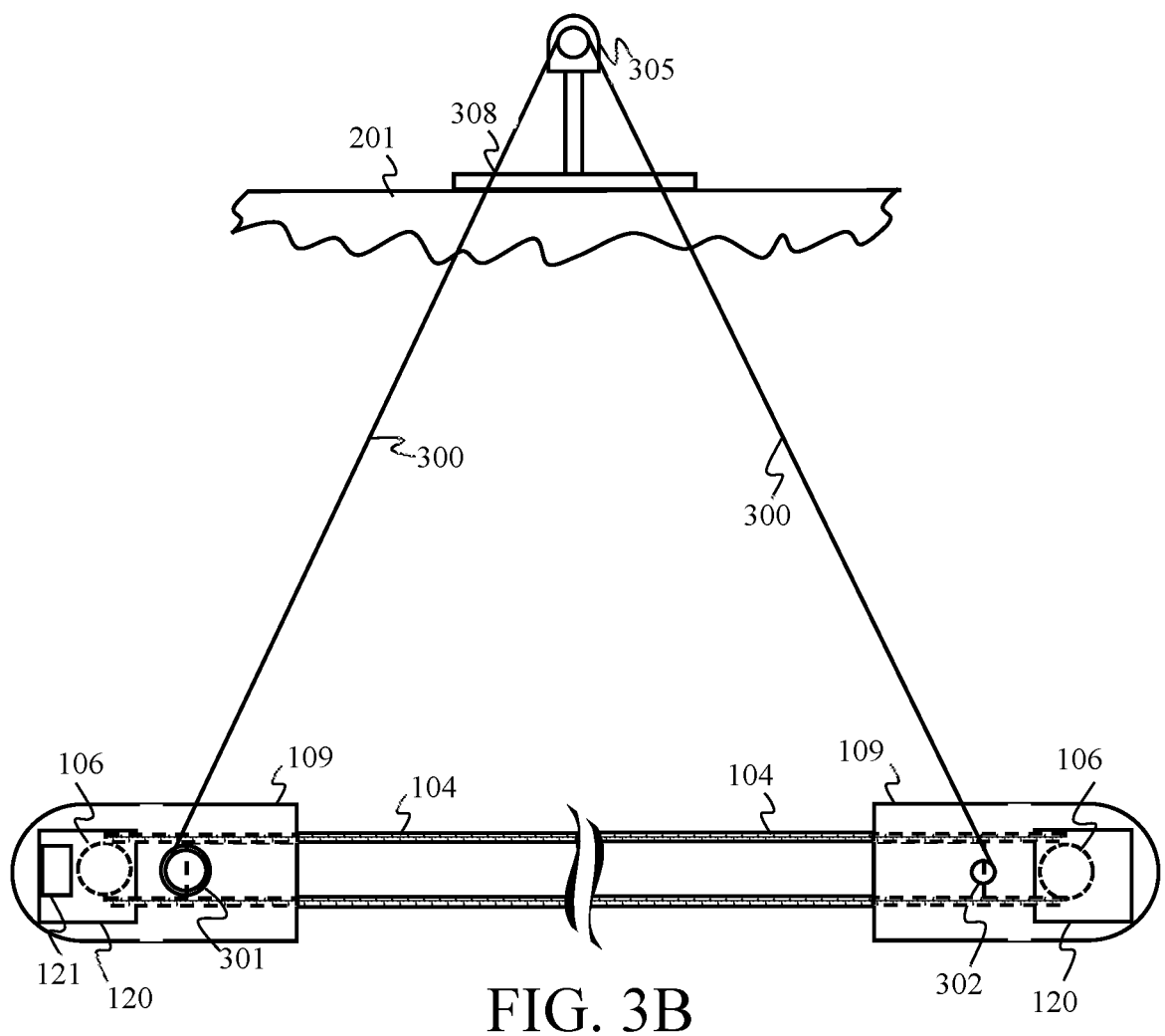

FIG. 3A illustrates a chainsaw mill configuration that employs two powerheads. FIG. 3B depicts the top view of the chainsaw mill in FIG. 3A. The double-ended chainsaw bar 102 guides the chain 104, which is powered by motors 120 mechanically coupled to rim gears 106. A winch can comprise a pulling cable 300, a cable attachment point 302, and a powered cable drum 301. The winch may further comprise a pulley 305 and mounting bracket 308.

The pulling cable 300 is attached near each end of the chainsaw mill assembly so that the winch can pull the assembly in a straight line toward the edge of the log 201. The term, "pulling cable" 300, as used herein, includes any suitable line, cord, and/or rope. In some aspects, it is advantageous to use a natural-fiber or synthetic-fiber line, cord, or rope which is easy to cut. For example, the powered cable drum 301 and cable attachment point 302 may be affixed to the bar 102, the frames 112, the housings 109, the gantry (e.g., to member 218), and/or to a carriage that rides upon the rails 221 and 222.

The powered cable drum 301 may be an engine or motor-driven winch. The engine or motor can be an integral part of a winch assembly that includes the cable drum 301, or the chainsaw motor 120 might be configured to power the cable drum 301. The cable drum 301 can comprise a winch controller that engages or disengages the cable drum 301 from the chainsaw motor or other power source, or can switch on or off the cable drum's 301 power source. In one example, the winch controller is responsive to a wireless signal transmitted by a user-operated wireless remote controller. The wireless communication system employed by the winch controller and wireless remote controller can be configured to enable the winch to be operated from a safe distance from the chainsaw mill. In another example, the winch controller is responsive to the mill's operation, such as to disengage power to the cable drum 301 when the chainsaw engine throttles down or shuts off.

The winch controller can be communicatively coupled to one or more sensors on or in the vicinity of the mill, such as to control the operation of the cable drum 301 in response to sensor readings. In one example, the controller receives data from a tension sensor that detects tension on the cable 300, and the controller can determine whether or not to adjust power to the cable drum 301 based on at least one predetermined tension threshold. The controller can be programmed to respond to a predetermined amount of increase in detected tension to increase or decrease the power to the cable drum 301, depending on circumstances. The controller might be programmed to disengage power to the cable drum 301 when tension falls below a threshold that indicates that the saw has reached the end of the log. In other aspects, the winch controller can be part of a control system that controls other operations of the mill. In some aspects, ability of the controller to control certain operations can be automatically engaged and/or disengaged based on the operating state(s) of one or more other parts of the mill. For example, when the chainsaw motor's 120 clutch is disengaged, the controller might prevent the cable drum 301 from being powered.

Adjacent to the log's rearmost end, the mounting bracket 308 can be attached to the log, the rails, or some other structure. Since the pulley 305 is past the rearmost end, the winch pulls the chainsaw bar in the direction of the rails and past the rearmost end of the log to complete the cut through the log.

Figure 4A:
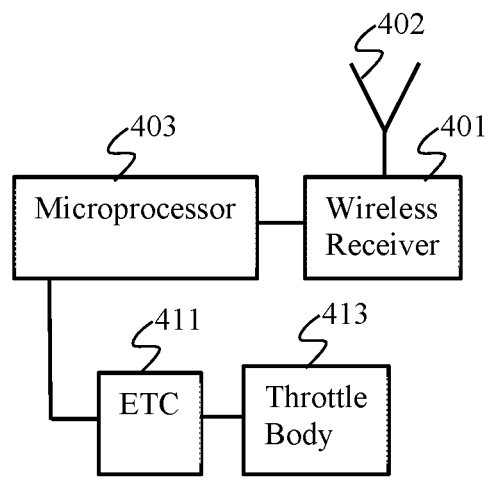
FIG. 4A shows components of a wireless throttle controller for a chainsaw.

In FIG. 4A, a wireless receiver 401 is configured to receive a wireless control signal via antenna system 402. Received control signals are communicated to a microprocessor 403, which may pass the control signal to an electronic throttle controller (ETC) 411 or generate an electronic control signal that is communicated to the ETC 411. The ETC 411 controls the throttle body 413. Signals input to the ETC 411 can be processed by an electronic control unit (not shown) that uses software to determine the required throttle position based on signal inputs, such as the control signal. Signals input to the ETC 411 may also include sensor data, such as data from an engine speed sensor and/or other sensors. The ETC 411 can read input signals and/or data, and then transmit servomotor instructions to the throttle body 413.

The microprocessor 403 might convert the received wireless control signal into the electronic control signal. In some aspects, the microprocessor 403 can perform a computation based on the received wireless control signal, the current state of the motor, sensor data, and/or other operational parameters of the mill and/or wireless system, and then generate the electronic control signal based on the results of the computation. Disclosed aspects can be configured to control a fuel (e.g., gasoline) motor or an electric motor. Other motor operations besides the throttle might be controlled via wireless control signaling.

Figure 4B:
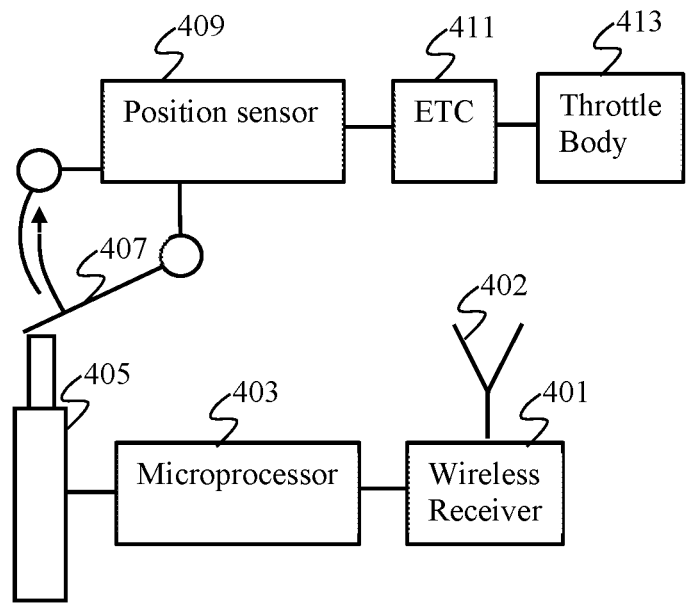
FIG. 4B shows a wireless throttle controller that can be retrofitted to an existing chainsaw.

FIG. 4B illustrates components of a retrofit device for a chainsaw to enable throttle control via wireless control signaling. The chainsaw might comprise a throttle trigger 407 or some other user-operable mechanical device designed to enable control of the throttle. A position sensor 409 is responsive to the trigger's 407 position for activating a throttle controller, such as ETC 411, or some other type of throttle control device. In this example, wireless control signals received by the wireless receiver 401 can be converted by the microprocessor 403 to actuator control signals, which direct an actuator 405 to mechanically operate the trigger 407. The ETC 411 may read the input from the position sensor 409 and transmit servomotor instructions to the throttle body 413. If the trigger 407 comprises a simple switch, the ETC 411 might cause the throttle to open or close based on whether the switch is closed or open, for example.

In one example, an electric rotary or linear actuator (e.g., a servomotor) 405 can be positioned on the chainsaw to depress and release the throttle trigger 407. The actuator 405 should apply a force that at least meets the trigger load (e.g., spring load) to depress the trigger 407, and maintain a sufficient static load to keep the trigger 407 depressed, or employ a locking mechanism to temporarily lock the trigger 407.

In one example, a device configured to employ wireless control signals to operate a chainsaw comprises the actuator 405, which may include an AC or DC motor, a power source to operate the motor, a circuit (e.g., microprocessor 403) that is responsive to an electronic control signal to activate/deactivate and/or otherwise control the actuator 405, and the wireless receiver 401 (with the antenna system 402) that produces the electronic control signal in response to a received wireless control signal.

The wireless receiver 401 comprises any suitable antenna system 402 and a circuit that process a received wireless signal. The circuit can include an amplifier, frequency converter, analog-to-digital converter, filter, and/or other circuits. The actuator can comprise a microprocessor. The microprocessor might perform wireless receiver operations, such as frequency conversion, sampling, filtering, demodulation, and/or other receiver operations. In some instances, the wireless receiver may comprise a wireless transceiver, and the wireless transceiver may be configured to transmit wireless signals to the controller, to another actuator, and/or to other wireless devices. The wireless receiver 401 can be configured to receive sensor data transmitted wirelessly by sensors on and/or proximate to the chainsaw mill. The microprocessor 403 might process received sensor data independent from, or in coordination with, received wireless control signals in order to control the chainsaw throttle, such as via the actuator 405 or directly via the ETC 411.

Figure 5:
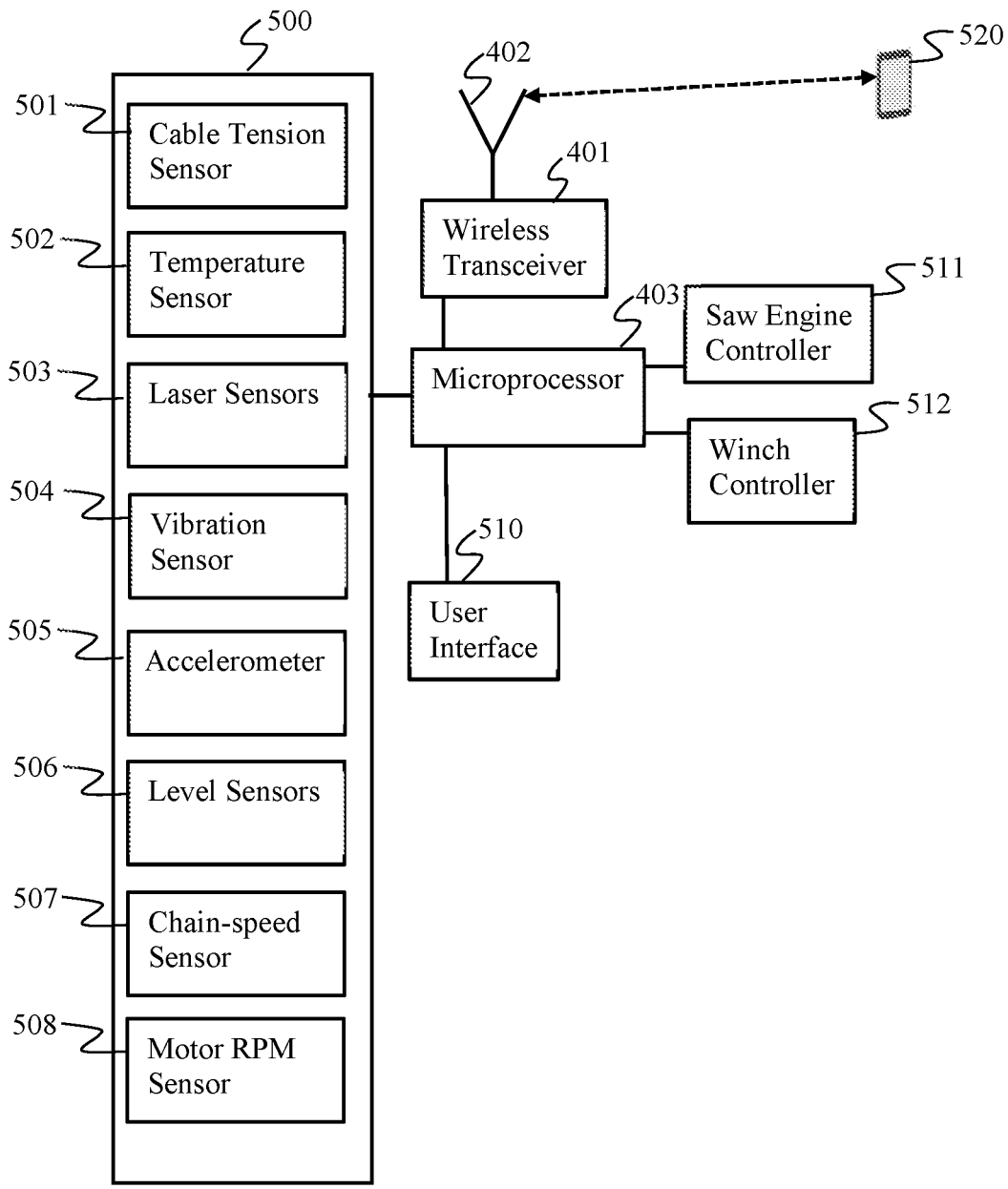
FIG. 5 illustrates a chainsaw mill control system according to some aspects of the disclosure.

FIG. 5 illustrates a chainsaw mill control system according to some aspects of the disclosure. The depicted system may operate autonomously, remotely via wireless control signals transmitted by a wireless user device, or may operate in a hybrid mode wherein one or more functions are programmable and at least one function is user controlled via wireless remote control.

The chainsaw mill control system comprises a microprocessor 403 or some other programmable computer system that is configured to receive input signals (via wireless and/or wired links) from sensors 500, wireless transceiver 401, and user interface 510. The microprocessor 403 might communicate sensor data, possibly including processed sensor data, and/or messages based on processed data to the user interface 510 and/or wireless transceiver 401. The wireless transceiver 401 can receive wireless control signals from a wireless user device 510, and may transmit sensor data and/or messages to the user device 510. The user interface 510 can comprise a combination of hardware and software that resides on the mill, and/or it can be a software program that resides on the user device 510. The microprocessor 403 is also communicatively coupled to saw engine controller(s) 511 and a winch controller 512, and is configurable for sending electronic control signals to the controllers 511 and 512.

The sensors 500 can include any of various sensors in and/or proximate to the chainsaw mill. In one example, the sensors 500 can include (but are not limited to) a tension sensor 501, temperature sensor 502, laser sensors 503, vibration sensor 504, accelerometer 505, level sensors 506, chain-speed sensor 507, and motor-speed sensor 508. The sensors 500 might include a chain speed sensor and an engine speed sensor. A cable tension sensor 501 can measure the tension on the cable 300, such as via a force measurement sensor on the pulley 305, drum 301, or anchor 302. Such measurements can indicate the hardness of the wood 201 and/or sharpness of the cutting chain 104. A chain 104 tension sensor can measure the tension of the chain 104 on the bar 102 and/or may measure the pressure of the slab 201 on the chain 104. Temperature sensors 502 can be located in the chainsaw motor(s) 120 and/or proximate to the cutting chain 104. Laser sensors 503 can measure position, distance, displacement, thickness, height, and/or width. Laser sensors 503 might measure the position of the mill relative to the sides and/or end of the log, and/or the width and/or height of the kerf Vibration sensor 504 might measure the vibrations on the mill and/or the slab 201. The accelerometer 505 and/or level sensors 506 can measure the orientation of the mill and/or slab. The chain-speed sensor 507 can measure the speed of the cutting chain. The motor-speed sensor 508 can measure the motor speed of the chainsaw powerhead(s) (e.g., motor(s)). Other sensors, which are not shown, might include a fuel gauge, battery charge gauge, oil pressure gauge, and/or other sensors.

The data provided by the sensors 500 can be used by the microprocessor 403 to the operate the sawmill, such as by controlling the engine(s) and/or winch. For example, the sensors 500 might include monitor the chain speed and engine speed, and chain-speed measurements from the chain speed sensor (e.g., when the chain stops) might trigger a fail-safe mode in the microprocessor 403 to cause the motor to return to idle. The microprocessor 403 can perform data analysis of the sensor data and generate control signals therefrom to adapt the sawmill's operation. The microprocessor 403 can communicate the data and messages generated from the data analysis to the user interface 510 and/or the user device 520. The microprocessor 403 might store timestamped data and/or analyses in computer memory.

The microprocessor 403 can be preprogrammed and/or may be programmable by the user to control the mill's operation, and may be configured to respond to certain sensor readings for adapting the mill's operation. The microprocessor 403 can have a set or range of predetermined and/or programmable thresholds for each of the sensors 500. A microprocessor program might automatically set sensor thresholds based on a user's input of selectable operating parameters, such as wood type, slab thickness, slab width, slab length, chain 104 type, motor(s) 120 type. Operating parameters of the mill (e.g., throttle, winch tension, etc.) might be preset or user-selectable.

In some instances, a microprocessor program might be uploaded to the microprocessor 403 via a data port on the user interface 510 and/or via the wireless network that connects the user device 520 to the wireless transceiver 401. In some instances, the microprocessor 403 might receive instructions from a computer program running on the user device 520. In various aspects, a non-transitory computer-readable memory has computer program code stored thereon, which is operable by one or more processors to perform operations disclosed herein, such as collecting and processing sensor data, communicating data and messages to the user device 520 and/or user interface 510, and, responsive to user inputs and/or sensor data, controlling the mill's operation. Any programmed instructions that operate the microprocessor 403 might be overridden by the user interface 510 or user device 520, and may automatically be overridden when the microprocessor 403 receives certain sensor data.

The wireless transceiver 401 and user device 520 may employ any suitable wireless communication technology to enable remote operation of the chainsaw mill. Such wireless communication technology might include, but is not limited to, Zigbee, Bluetooth, LoRaWAN, WiFi, WiGig, Z-Wave, 3GPP, device-to-device (D2D), IrDA, IEEE 802.15, EAP, RADIUS, infrared, or optical. The user device 520 may comprise a special-purpose controller configured to interface with the microprocessor 403 via the transceiver 401. In another example, the user device 520 may comprise a general-purpose device, such as a smartphone, tablet, laptop, or some other wireless device that can store computer code that configures the device to interface with the microprocessor 403 via the transceiver 401.

In some aspects, the user interface of the user device 520 can be configured to facilitate user control of the mill in harsh operating environments. For example, the touchscreen of a smartphone can be inconvenient to use in cold conditions or when the user is wearing gloves. Thus, the smartphone can be configured to employ its internal accelerometer to enable the user to operate the mills functions and otherwise communicate with the microprocessor 403. This can enable user-input controls to be selectable by tilting, pointing, shaking, and/or otherwise moving the device 520.

FIGS. 2A and 2B illustrate a roller assembly 240 that can be employed to position the gantry relative to one or more of the rails 221 and 222. For example, the roller assembly 240 can maintain structures of the chainsaw mill, such as the motor 120, a predetermined distance from the rails. This can counter the pull of the chainsaw mill as it cuts, thereby preventing the motor 120 from being pulled into the log 201. Specifically, the roller assembly 240 can ensure that the distance between the powerhead and the rails remains fixed throughout the entire length of the cut. The roller assembly 240 can be adjustably attached to the gantry (e.g., horizontal member 216) to enable the position of the roller assembly 240 to be adjustable. For example, the position of the roller assembly 240 might be adjusted during setup, before cutting begins.

Figure 6A:
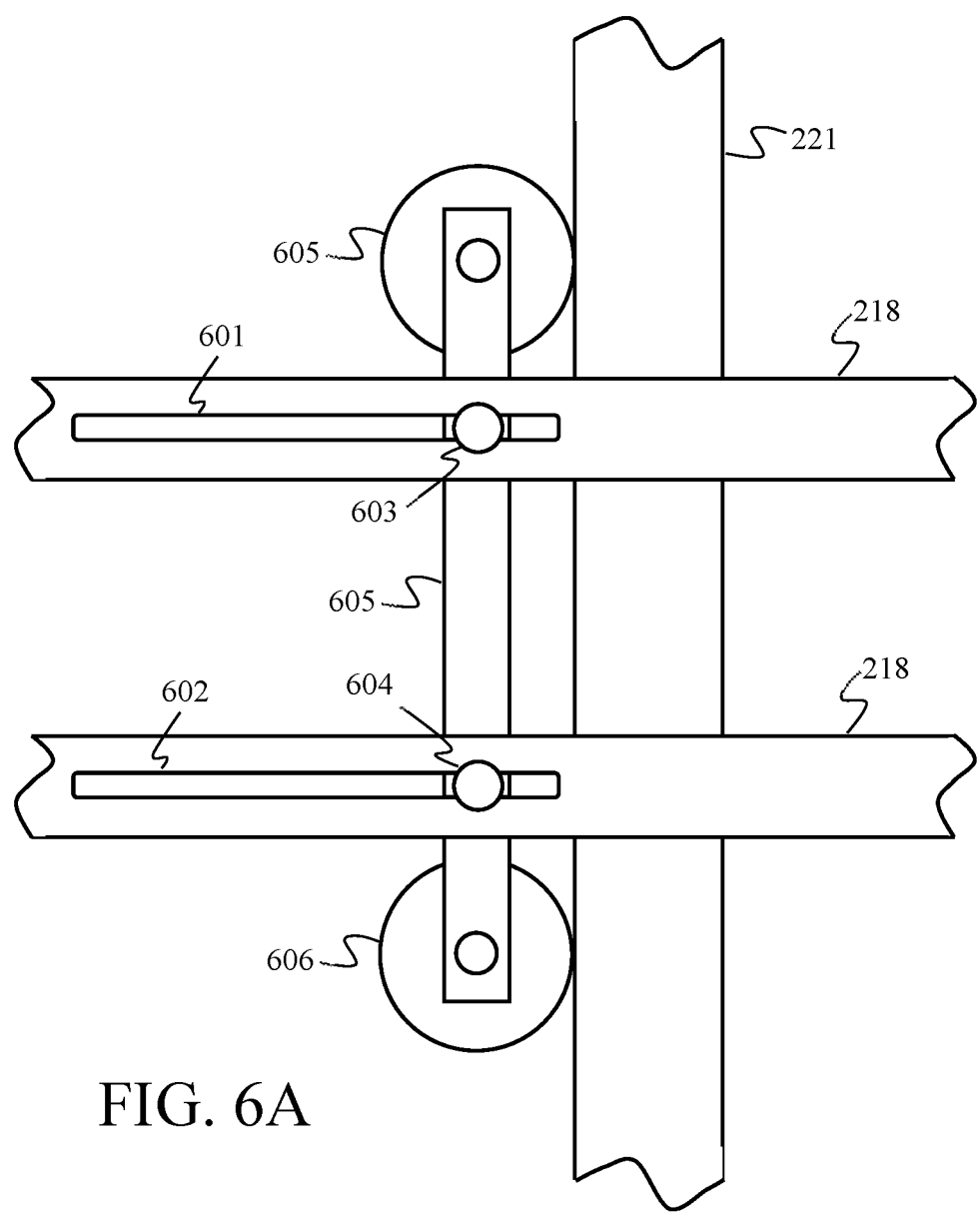
FIG. 6A illustrates a roller assembly that can be employed for positioning a sawmill in accordance with some aspects of the disclosure.

FIG. 6A illustrates an exemplary roller assembly (e.g., roller assembly 240), which comprises a roller assembly frame 605 that can hold rollers, or wheels 605 and 606, which are positioned to transit along the side of one or more of the rails 221 and 222. The frame 605 is attached to the gantry (e.g., members 218), so as to prevent the sawmill from being pulled toward the rails during cutting. As the cutting proceeds, the sawmill transits along the length of the rails 221 and 222, and the roller assembly maintains the sawmill's position perpendicularly to the rails 221 and 222 during the cut. The frame 605 comprises an adjustable attachment, such as bolts or wingnuts 603 and 604, that can be loosened and tightened. For example, the gantry might have slots 601 and 602, which allows the position of the roller assembly to be adjusted and/or selected. Alternatively, other types of connectors that can be locked and unlocked might be employed.

In some disclosed aspects, the weight of the sawmill causes the gantry to produce a normal force (e.g., a downward force) on the rails 221 and 222 when the rails are positioned on a horizontal surface. Specifically, the normal force presses downward (e.g., vertically downward) onto the top of the rails 221 and 222. The cutting action of the sawmill pulls the motor 120 in a direction toward the rails 221 and 222, the direction generally being perpendicular to the length of the rails 221 and 222. Thus, the cutting action causes the roller assembly 240 to produce a lateral force upon at least one of the rails 221 and 222 (the lateral force being perpendicular to the normal force, and generally parallel to the plane of the horizontal surface), such as where rollers 605 and 606 are in contact with the side rail 221. Thus, the roller assembly 240 might be adjustably positioned on the gantry (or on some other structure of the sawmill) to prevent the motor 120 (or other parts of the sawmill) from colliding with, or being drawn into, the log. If a carriage is employed to roll the gantry along the top of the rails 221 and 222, the carriage might comprise the roller assembly 240 (e.g., one or more guide wheels that roll along at least one side of at least one of the rails 221 and 222) to prevent lateral forces from derailing the carriage.

In some aspects, at least one of the rails 221 and 222 can comprise a groove, or some other track, in its lateral surface where the rollers 605 and 606 make contact with the rail 221 and/or 222. In some aspects, more than one roller assembly may be attached to the sawmill, each roller assembly being positioned to roll along one of the lateral surfaces of the rail(s) 221 and/or 222. For example, at least a second roller assembly may be provided. The second roller assembly might be configured (e.g., positioned on the gantry) to roll along at least one of the sides (e.g., the lateral surfaces) of the rail 222. In one example, the second roller assembly can be positioned on the opposite side of rail 221 relative to the position of the first roller assembly (such as the first roller assembly shown in FIG. 6A). A configuration of multiple roller assemblies might be made to help stabilize the sawmill, such as to mitigate vibration.

Figure 6B:
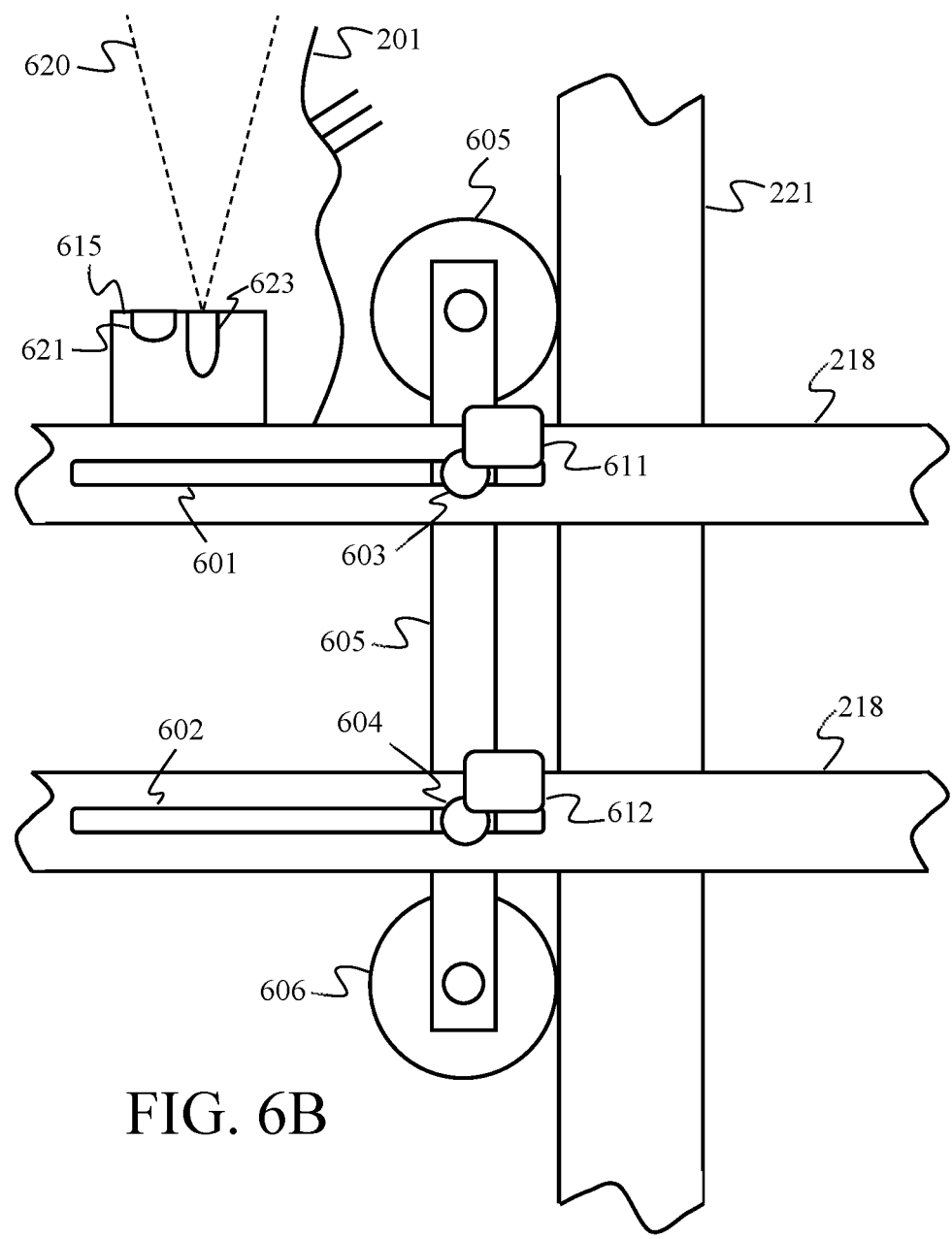
FIG. 6B illustrates an exemplary roller assembly with an electronically controlled position-adjustment mechanism in accordance with some aspects of the disclosure.

FIG. 6B illustrates an exemplary roller assembly with an electronically controlled position-adjustment mechanism. The adjustable attachments 603 and 604 can comprise an electronically controlled adjustment mechanism, such as servo-motors 611 and 612, which mechanically adjust the position of the frame 605 relative to the gantry structure 218. In one aspect, electronic control can be performed via wireless remote control. The servo-motors 611 and 612 may comprise a wireless communication transceiver that receives a control signal from a wireless terminal operated by a human user or a computer processor. The servo-motors 611 and 612 can be activated by the control signal to move the sawmill (e.g., the gantry) relative to the rails 221 and 222. In some aspects, the servo-motors 611 and 612 can further include at least one computer processor, which may be programmable to adjust the position of the sawmill relative to the rails 221 and 222.

In some aspects, a remote-sensing system 615 may be located on the sawmill, such as on the gantry, the motor, or on some other structure of the sawmill. The remote-sensing system 615 can be configured to detect obstacles that might interfere with the operation of the sawmill.

Furthermore, remote-sensing system 615 can be configured to control the operation of the sawmill in response to any obstacles it detects. In one aspect, the remote-sensing system 615 comprises a proximity detector. The remote-sensing system 615 might comprise a laser range-finder, or telemeter. A transmitter 623, such as a laser, transmits signals that are within a field of view 620 of a receiver (e.g., an optical sensor) 615 that is tuned to receive reflections of the transmitted signals. A computer processor in the system 615 can measure the "time of flight" of the received reflections to determine the distance to an obstacle.

Any of various types of scanning and imaging systems may be employed in the remote-sensing system 615 to determine, from remote-sensing measurements, the extent of how the obstacle might interfere with the sawmill's operation. The remote-sensing system 615 might determine, from the measurements, how much to adjust the position of the sawmill relative to the rails 221 and 222 to prevent the motor 120 (or other sawmill structure) from colliding with the obstacle. Accordingly, the remote-sensing system 615 may be communicatively coupled with the servo-motors 611 and 612. Thus, the remote-sensing system 615 might comprise a wireless transceiver, or wired communication ports that communicatively couple to the roller assembly. In one example, a computer processor in the remote-sensing system 615 detects an obstacle, determines the extent that the obstacle might interfere with the sawmill's operation, computes an amount to adjust the sawmill's position, and communicates a control signal to the positioning system (e.g., servo-motors 611 and 612), which responds to the control signal by adjusting the position of the sawmill by the amount specified in the control signal. In one aspect, the remote-sensing system 615 might send an alert or status signal to a user device. In another aspect, the remote-sensing system 615 might send a control signal to control the winch 301 or shut off the motor 120.

Figure 7:
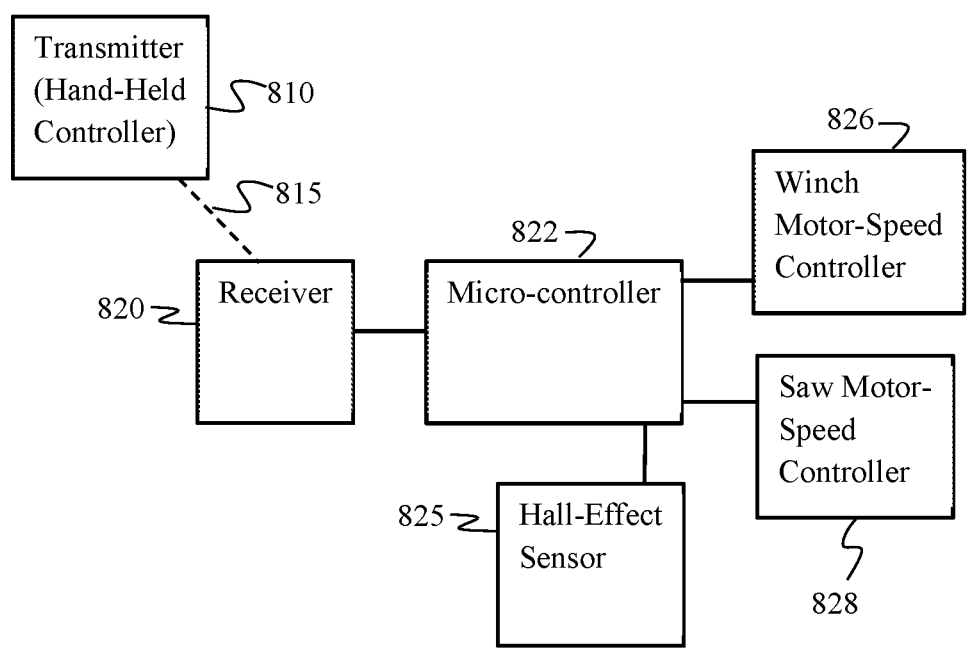
FIG. 7 illustrates an electronic control system configured for use during the operation of a saw mill according to various aspects of the disclosure.

FIG. 7 is a block diagram that illustrates electronic components of a sawmill that can provide for remote-controlled and/or automated operation of the sawmill. A receiver 820 is configured to receive communication signals comprising sawmill operating instructions. In one example, the receiver receives a wireless signal 815 transmitted by a remote-control transmitter 810, such as a hand-held controller. The receiver is communicatively coupled to a computer processor, such as a micro-controller 822. Inputs to the micro-controller 822 can include the instructions received by the receiver 820 and sensor readings from one or more sensors, such as a Hall-effect sensor 825 that can be configured to measure the speed of the chain 104. The micro-controller 822 is communicatively coupled to one or more control systems of the sawmill. In one example, the micro-controller 822 is communicatively coupled to a winch motor-speed controller 826 and a saw motor-speed controller 828.

In one example, a second power source (e.g., a lithium batter, which is not shown) that is separate from the chainsaw powerhead might be used to supply electrical power to some or all of the blocks shown in FIG. 7 corresponding to electronic components of the sawmill. For example, the second power source might provide power to blocks 820, 822, 825, 826, and 828. In other aspects, one or more of the blocks might be powered by the chainsaw powerhead(s).

In one example, the transmitter 810 comprises a user interface and/or a machine-type interface. The user interface may comprise a graphical user interface. The user interface can comprise one or more selectable control options that enable the user to control one or more operations of the sawmill. The user interface may allow for selecting automation parameters of the sawmill's operations. The user interface may allow for programming the micro-controller 822. The transmitter 810 may comprise a receiver configured to receive messages transmitted by the micro-controller 822. In one example, the micro-controller 822 can transmit sensor readings and/or operating status to the transmitter 810. The machine-type interface can comprise hardware and software. In one aspect, the software comprises an application programming interface (API) that allows a remote software application (such as a software application in the transmitter 810) to access features and/or data of the software application in the micro-controller 822.

In some aspects, the transmitter 810 is configured to operate multiple devices. The multiple devices might be multiple sawmills and/or multiple components of each sawmill. The transmitter 810 might employ any wireless technology configured to communicate instructions to the receiver 820. The receiver 820 can demodulate received transmissions to recover instructions modulated thereon, and communicate the instructions to the micro-controller 822. A communication link between the receiver 820 and the micro-controller 822 might comprise multiple channels for controlling different aspects or functions of the micro-controller 822. The communication link between the receiver 820 and the micro-controller 822 may comprise a wired link or a wireless link. By way of example, this wireless link may employ the same or different wireless technology employed in link 815.

The micro-controller 822 receives inputs from one or more sensors. By way of example, a Hall-effect sensor 825 provides measurements of the chain speed to the micro-controller 822. In response to the chain speed, the micro-controller 822 can adjust the winch motor speed (e.g., by sending control signals to the winch motor-speed controller 826) and/or adjust the saw motor speed (e.g., by sending control signals to the saw motor speed controller 828). In one example, the controller 828 comprises a servomechanism or servomotor configured to control the motor's 120 throttle. The micro-controller 822 may provide for preset throttle levels and/or a continuous range of throttle levels. For example, at idle, the throttle might be set to zero. A chain freewheel throttle level might be 10%. Cutting throttle might range from 20% to 80%. Full throttle might be 100%. Throttle settings may be adapted according to sensor readings and/or inputs from the receiver 820.

In some instances, the micro-controller 822 can adjust or limit the range of throttle presets based on sensor information, wherein the sensor information indicates operating conditions and/or operating parameters of the sawmill. For example, the micro-controller 822 may set a range of selectable throttle levels based on the received sensor information, the range defining boundaries of operation, and the micro-controller 822 can be responsive to throttle-control instructions by adapting the throttle-control instructions to be within the boundaries of operation.

In some instances, the motor speed is the same as the chain speed. For some motors, such as gasoline motors, the motor speed and chain speed can be different. The relationship between motor speed and chain speed can be due to operating states. For example, a motor that has a clutch might be in an idle state, wherein the engine speed is 500 revolutions per minute (RPM) and the chain speed is zero. In a clutch-slip state, such as when the chain is stuck, the engine speed might be much higher than 500 RPM, but should be returned to the idle state. The micro-controller 822 can be provided with inputs from a chain speed sensor (e.g., sensor 825) and a motor RPM sensor (not shown). The micro-controller 822 can be programmed to adjust the motor RPMs based on the chain speed, such as described above.

Figure 8:
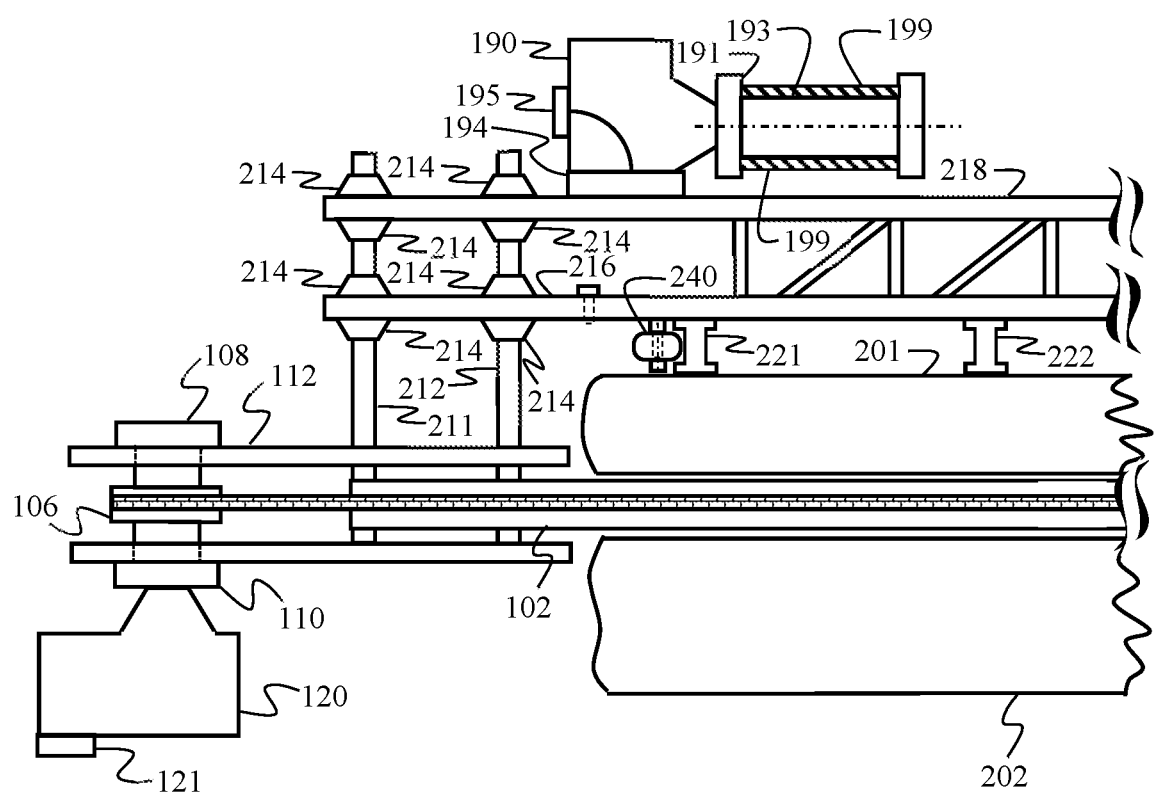
FIG. 8 illustrates a sawmill according to some aspects of the disclosure.

FIG. 8 illustrates a sawmill according to some aspects of the disclosure. A travel motor 190, which comprises a drive shaft 193 and speed/direction controller 195, is mechanically coupled to the mill frame (e.g., top member 218 of the gantry depicted here). The drive shaft 193 can comprise a toothed or slotted wheel (e.g., a gear wheel, drum, or roller) configured to engage ribs, teeth, slots, or perforations in a drive belt (or chain) 199.

In one aspect, the drive shaft might comprise a rotary shaft to which at least one toothed or slotted wheel is affixed such that the rotation axis of the at least one wheel is the same as the rotation axis of the rotary shaft. The at least one wheel can have a toothed outer surface, and the drive belt 199 can have at least one toothed surface, the drive belt 199 being oriented relative to the at least one wheel to enable the toothed outer surface of the at least one wheel to engage with the toothed surface of the belt 199. Rotation of the wheel driven by the travel motor pulls on the drive belt, which is affixed to at least one end of the guide rail(s) 221 and 222, causing the travel motor (and any assembly to which the travel motor is attached, e.g., the mill frame, or gantry) to transit along the guide rail(s) 221 and 222. Thus, the travel motor can drive the mill frame forward and reverse along the drive belt 199, which is positioned parallel to the rails 221 and 222 of the track, or ladder. The rollers 605 and 606 guide the mill frame along the track/ladder (e.g., rail 221), enabling the travel motor to draw the chainsaw from one end of the slab 201 to the other end.

Tension sensors can be provisioned in various ways to measure tension on the belt 199. In one aspect, a tension sensor 194 might be mounted in contact with the travel motor 190 and the mill frame (e.g., member 218), the mounting configured to provide a measure of tension on the belt 199. In one example, the travel motor 190 might be affixed to a track slider, a roller track, a sliding bracket mount that is rigidly secured to the mill frame 218, but permits the travel motor 190 to slide (e.g., a limited amount) along the mill frame 218. The tension sensor 194 can be mounted to resist the travel motor's 190 movement along the mill frame 218, thus providing a measurement of tension or compression that indicates belt 199 tension.

Tension Links, S-Type load cells, Crane Scales, Canisters, and Pancakes are examples of tension-type load cells. Load cells are force transducers, which convert force, such as tension, compression, pressure, or torque, into a measurable electrical signal. The strength of the signal changes in proportion to the force applied. There are three basic load cell types: hydraulic, pneumatic, and strain gauge. In a tension load cell, strain gauges are set up parallel with the loading axis. When tension force is applied, the wire component of the strain gauge gets longer and thinner, thereby increasing its electrical resistance. This change in resistance is directly proportional to the amount of force applied, thereby making it possible to determine the amount of force applied. In some aspects, compression/tension load cells might be employed. The controller 195 is communicatively coupled to the tensor sensor 194 and configured to receive tension measurements from the sensor 194. The controller 195 can be responsive to the tension measurements for increasing or decreasing the travel motor 190 drive speed or torque.

Since the communicatively coupling of the tensor sensor 194 to the controller 195 can be wire or wireless, the (at least one) tensor sensor 194 might be located in the belt 199, at either or both ends of the belt 199, and or on the track/ladder, the controller 195 and sensor(s) 194 each comprising a wireless transceiver (e.g., modem). The controller 195 can receive the sensor 194 measurements via its wireless transceiver. Furthermore, the controller 195 might comprise wireless connectivity for communicating control messages to a transceiver on the travel motor 190, the transceiver being responsive to the control messages to effect selection of the motor's 190 operating parameters. In some aspects, the controller 195 might comprise a processor in a wireless device, such as a User Equipment configured to operate in cellular and/or wireless networks.

Figure 9:
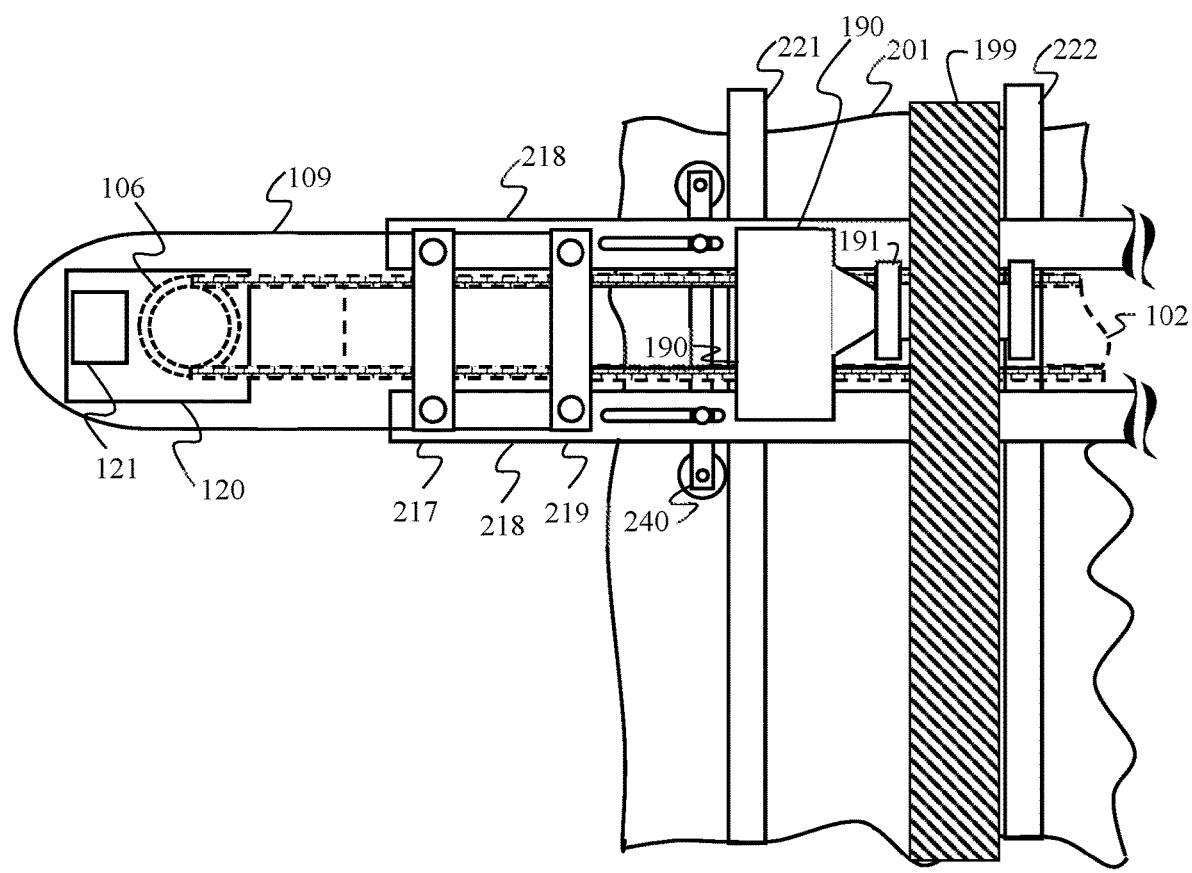
FIG. 9 illustrates a possible configuration of a sawmill according to some aspects of the disclosure.

FIG. 9 illustrates a possible configuration of a sawmill according to some aspects of the disclosure. The travel motor 190 is mechanically attached to the gantry (e.g., members 218 and 219), possibly via tensor sensor 194. The drive shaft 193 comprises a toothed or slotted wheel (shown comprising at least one wheel or pulley guide 191) configured to engage ribs, teeth, slots, or perforations in the drive belt 199. The drive belt 199 can comprise a flexible material (e.g., reinforced rubber, PVC, polychain, or the like) or a flexible structure (e.g., a chain, or the like). Mechanical interaction of the travel motor's 190 wheel on the drive belt 199 pulls and/or pushes on the belt 199, driving the gantry forward or reverse in a direction along the rails 221 and 222.

Figure 10:
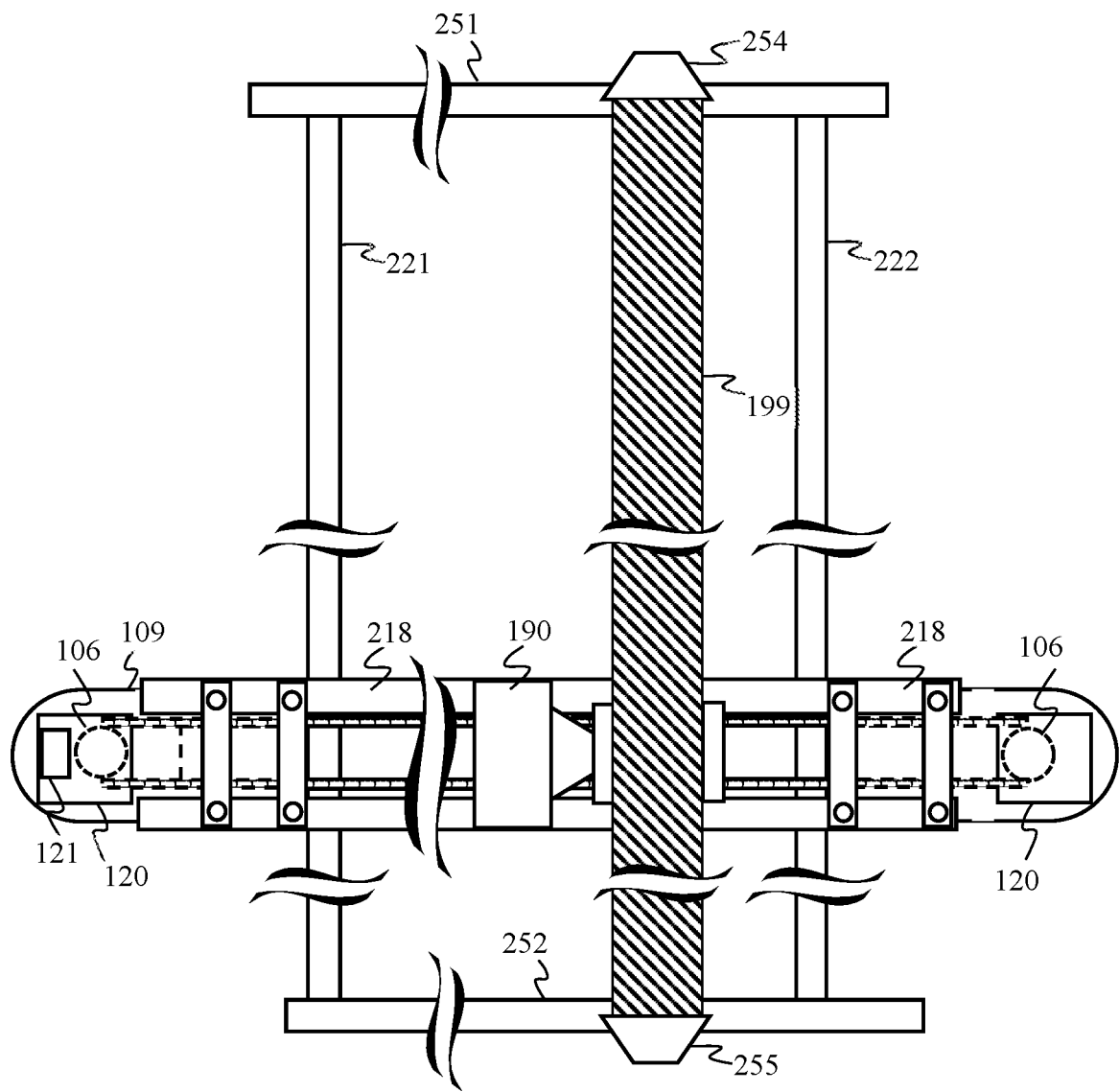
FIG. 10 illustrates a possible configuration of a sawmill according to some aspects of the disclosure.

FIG. 10 illustrates a possible configuration of a sawmill according to some aspects of the disclosure. The track, or ladder, comprises the rails 221 and 222 and at least (e.g., horizontal) crosspiece members 251 and 252 connecting the rails 221 and 222. The belt 199 can be fastened at both ends of the track, or ladder, such as via connectors 254 and 255 on crosspiece members 251 and 252, respectively. In an exemplary aspect, the travel motor 190 drives the gantry along the length of the rails 221 and 222, from crosspiece member 251 up to at least crosspiece member 252, enabling the sawmill to cut a slab having a length up to at least the distance between the crosspiece members 251 and 252.

In some aspects, multiple belts might be employed, and such aspects might comprise multiple travel motor wheels or multiple travel motors. In various aspects, one or more travel motors might be connected to the track/ladder (such as at one or both ends 251 and 252) and the belt(s) might be connected to the gantry. In another aspect, the sawmill might employ a belt conveyor wherein the gantry is connected to the belt and at least one travel motor connected to the track/ladder drives the gantry along the rails 221 and 222.

Figure 11A:
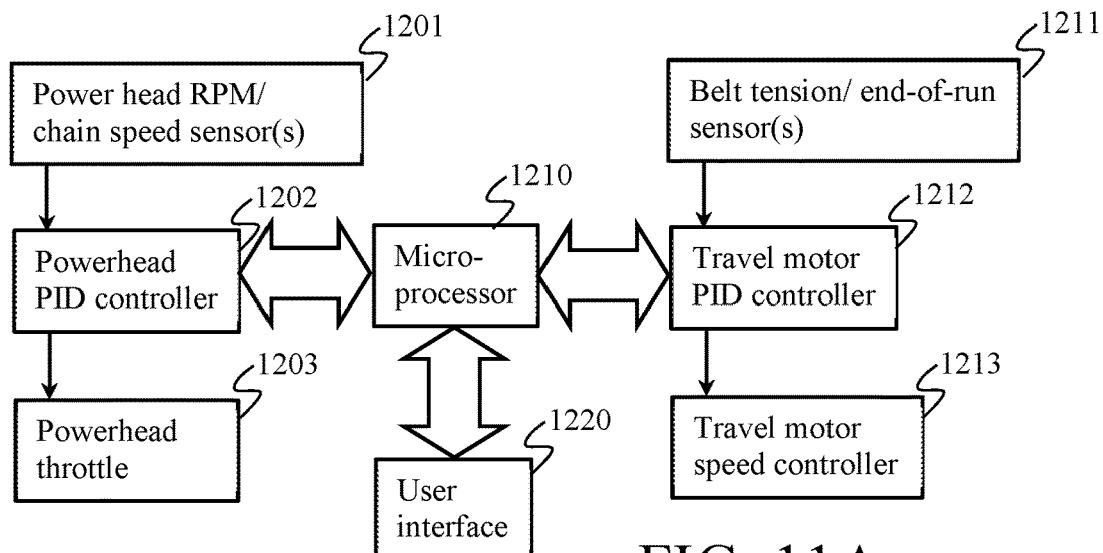
FIG. 11A depicts non-limiting method and apparatus aspects that can be configured according to various implementations of disclosed herein.

FIG. 11A depicts non-limiting method and apparatus aspects that can be configured according to various implementations of disclosed herein. A power-head control branch comprises one or more sensors 1201, a controller (e.g., a proportional-integral-derivative, or PID, controller) 1202, and a powerhead process control system 1203. A travel motor control branch comprises one or more sensors 1211, controller (e.g., PID controller) 1212, and travel motor process control system 1213.

By way of example, but without limitation, the sensor(s) 1201 might comprise a powerhead RPM (revolutions per minute) sensor, a chain speed sensor, a throttle position sensor, and/or one or more other sensors that provide operating status information about the powerhead(s). The powerhead process control system 1203 might comprise a throttle control or some other motor speed control for the one or more powerheads. A PID function 1202 might control the throttle 1203. The PID 1202 input can comprise RPM, and the setpoint can comprise an RPM value. The PID 1202 output can comprise a throttle adjustment to control the powerhead RPM.

By way of example, but without limitation, the sensor(s) 1211 might comprise a belt tension sensor, an end-of-run sensor, a motor speed sensor, and/or one or more other sensors that provide operating status information about the travel motor's operation. The travel motor process control system 1213 might comprise a motor speed controller, governor, speed direction controller, and/or motor torque controller that is configurable to control the travel motor's operation.

In one aspect, the power-head control branch and the travel motor control branch operate independently of each other. In other aspects, one or both of the power-head control branch and the travel motor control branch can be configured to operate cooperatively with the other, and such operations can be achieved in various ways. In one aspect, PID controllers 1202 and 1212 might communicate directly with each other. In another aspect, a microprocessor 1210 or microcontroller might configure the operation of either or both controllers 1202 and 1212. In some instances, sensor information in one of the branches might be input as sensor information to the controller of the other branch. In some instances, a control action performed by the controller in one of the branches might be input as information into the controller of the other branch, the controller of the other branch being configured to respond to the information for controlling its corresponding process.

Figure 11B:
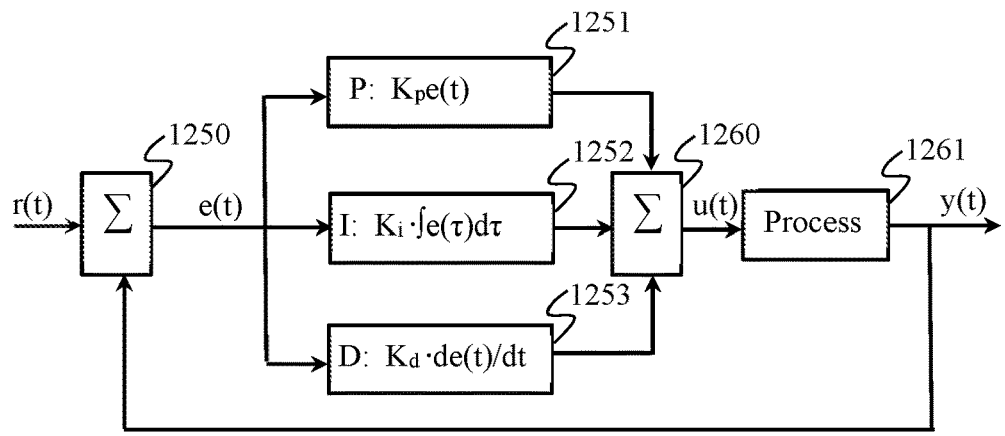
FIG. 11B illustrates an exemplary PID controller according to some aspects of the disclosure.

FIG. 11B illustrates an exemplary PID controller according to some aspects of the disclosure. A PID controller, or three-term controller, is a control-loop mechanism employing feedback that is widely used in industrial control systems and a variety of other applications requiring continuously modulated control. A PID controller continuously calculates an error value e(t) as the difference 1250 between a desired setpoint (SP) and a measured process variable (PV) and applies a correction based on proportional, integral, and derivative terms (denoted P, I, and D respectively).

The PID can automatically apply a responsive correction to a control function 1261. In one example, the controller 1212 adapts the travel motor's throttle 1213 to maintain a constant tension (as measured by sensor(s) 1211). In another example, the controller 1202 adapts the chain saw motor's throttle 1203 to maintain a constant RPM or chain speed (as measured by sensor(s) 1201). In another example, the controller 1202 might adapts the chain saw motor's throttle 1203 to maintain a constant travel speed and/or tension (such as measured by sensor(s) 1211). The controller's 1202 and/or 1212 PID algorithm restores the measured tension and/or speed to the desired tension and/or speed, preferably with minimal delay and overshoot, by increasing or decreasing the power output of the motor(s) in a controlled manner.

The PID controller can employ the three control terms of proportional, integral, and derivative influence on the controller output to apply control. In FIG. 11B, the PID controller continuously calculates an error value e(t) as the difference 1250 between a desired setpoint SP=r(t) and a measured process variable PV=y(t):

$$e(t)=r(t)-y(t)$$

and applies a correction based on proportional 1251, integral 1252, and derivative computations 1253. The controller attempts to minimize the error over time by adjustment of a control variable u(t), such as engine throttle, to a new value determined by a weighted sum 1260 of the control terms 1251-1253.

In one aspect, the term "P" 1251 is proportional to the current value of the SP-PV error e(t). For example, if the error is large and positive, the control output will be proportionately large and positive, taking into account the gain factor "K". Using proportional control alone will generally result in an error between the setpoint and the actual process value because it requires an error to generate the proportional response. The controller cannot adjust the system unless there is an error present.

Term "I" 1252 accounts for past values of the SP-PV error and integrates them over time to produce the "I" term 1252. For example, if there is a residual SP-PV error after the application of proportional control, the integral term seeks to eliminate the residual error by adding a control effect due to the historic cumulative value of the error. When the error is eliminated, the integral term will cease to grow. This will result in the proportional effect diminishing as the error decreases, but this is compensated for by the growing integral effect.

Term "D" 1253 is a best estimate of the future trend of the SP-PV error, based on its current rate of change. It is sometimes called anticipatory control, as it is effectively seeking to reduce the effect of the SP-PV error by exerting a control influence generated by the rate of error change. The more rapid the change, the greater the controlling or damping effect.

The balance of the aforementioned effects can be achieved by loop tuning to produce the optimal control function. The tuning constants are shown as "K" and might be derived for each control application, as they depend on the response characteristics of the complete loop external to the controller. These are dependent on the behavior of the measuring sensor(s), the final control element (such as a throttle or motor speed), any control signal delays, and the process itself. Approximate values of constants can usually be initially entered based on the type of application, and then refined, or tuned, by "bumping" the process, such as by introducing a setpoint change and observing the system response. In some aspects, Artificial Intelligence (AI), such as a deep learning neural network, a long-short term memory network, and/or other artificial neural network architecture, might be configured to tune the system. In some aspects, an AI may be configured to learn how to provision a tuning strategy.

The mathematical model and practical loop can use a direct control action for all the terms, which means an increasing positive error can result in an increasing positive control output correction. The system is called reverse acting if it is necessary to apply negative corrective action. The control function can be expressed by:

$$u(t) = K_p e(t) + K_i \int_0^t e(\tau)d\tau + K_d \frac{de(t)}{dt}$$

where $K_p$, $K_i$, and $K_d$ are coefficients for the proportional, integral, and derivative terms respectively. In some instances, $K_i=K_p/T_i$ and $K_d=K_p \cdot T_d$, where $T_i$ is an integration time and $T_d$ is a derivative time. $K_p \cdot T_d$ indicates how long the controller will tolerate the output being consistently above or below the set point, and $K_p \cdot T_d$ is the time constant with which the controller will attempt to approach the set point.

Although a PID controller has three control terms, some disclosed aspect might employ only one or two terms to provide appropriate control. This can be achieved by setting the unused parameters to zero, and is referred to as a PI, PD, P, or I controller in the absence of the other control actions. PI controllers are fairly common in applications where derivative action would be sensitive to measurement noise, but the integral term is often needed for the system to reach its target value.

In some aspects, lead-lag compensation might be employed, such as to compensate for delay in the measurement of the process value or if the control action does not apply quickly enough. A response parameter(s) of the controller might be measured in terms of its responsiveness to an error, the degree to which the system overshoots a setpoint, and/or the degree of any system oscillation. The lead-lag compensation might employ the response parameter(s) to improve system performance.

Disclosed PID controllers might be implemented as computer software (such as in a distributed control system), programmable logic controllers (PLCs), or discrete compact controllers. Digital controllers might be implemented using microcontrollers or FPGAs to implement PID algorithms.

In one aspect, measured tension (by at least one tension sensor) on the travel motor is the process variable delivered from sensor(s) 1211 to PID 1212. The desired tension is the setpoint, which might be provided to the PID 1212 by the microprocessor 1210, PID 1202, user interface 1220, or may be preprogrammed in the PID 1212. The difference between the process variable and the setpoint is the error. The input to the process 1261 (e.g., the travel motor speed controller 1213 and/or the chainsaw motor throttle 1203) is provided by the output of the PID controller 1212.

In order to provide for a controlled arrival at the desired tension in a timely and accurate way, the controlled system can be critically damped. The setpoint might be generated by another system, such as a PLC or other computer system, so that it varies depending on the work. For example, desired tension might be adjusted based on the sensed location of the gantry on the frame's rail(s). An end-of-run sensor (e.g., a proximity sensor, such as might include a photoelectric, inductive, or capacitive proximity sensor) might be provisioned to sense the end of a cut, and the sensor input might be used by the PID 1202 and/or 1212 to adapt the travel motor's speed (and/or optionally, the power-head throttle or chain speed) upon the end of the cut and/or upon nearing the end of the cut (e.g., the end of the mill frame). The tension setpoint (and/or at least one other setpoint) might be adjusted based on any of the various sensor-measured operating parameters of the mill, including the fuel level (or remaining battery life), oil pressure, temperature, vibration, etc.

In one aspect, the tension sensor 1211 can sense the end of the cut (such as when the tension drops), and the PID 1212 can be responsive to the measured drop in tension to stop the travel motor. The PID 1202 might be responsive to the drop in tension (e.g., sensor(s) 1211) to disengage or shut down the powerhead(s).

Figure 11C:
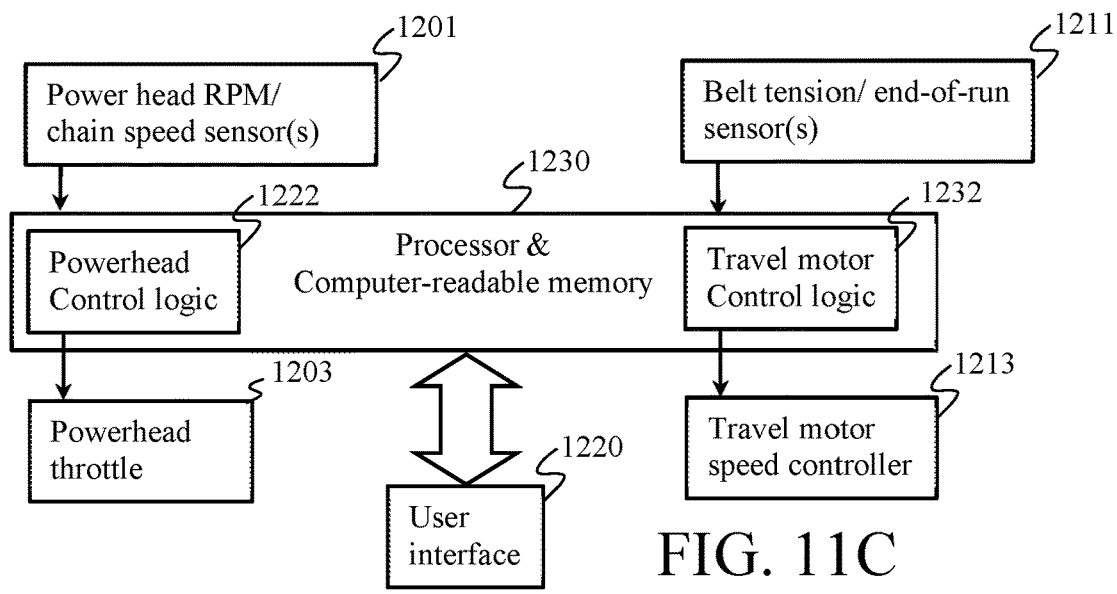
FIG. 11C illustrates disclosed aspects wherein powerhead control and travel motor control can be implemented by at least one processor To facilitate understanding, identical reference numerals have been used, where possible, to designate identical elements that are common to the figures. It is contemplated that elements disclosed in one aspect may be beneficially utilized on other aspects without specific recitation.

FIG. 11C illustrates disclosed aspects wherein powerhead control and travel motor control can be implemented by at least one processor 1230. In one instance, the at least one processor 1230 comprises a general-purpose processor configured by instructions in at least one computer-readable memory for executing functions disclosed herein. In another instance, the at least one processor 1230 comprises an application-specific integrated circuit configured to perform functions disclosed herein. The at least one processor 1230 receives sensor inputs from sensors 1201 and 1211, and optionally, user inputs from user interface 1220. The at least one processor 1230 comprises powerhead control logic 1222 and travel motor control logic 1223, which can comprise computer program code and/or circuits configured to perform powerhead control and travel motor control, such as described with respect to PID controllers 1202 and 1212, respectively. The powerhead control logic 1222 and travel motor control logic 1223 receives input from one or both sensor sets 1201 and 1211.

The powerhead control logic 1222 is configured to control at least the powerhead throttle 1203, and the travel motor control logic 1232 is configured to control at least the travel motor speed 1213. The at least one processor 1230 can be configured to communicate data to the user interface 1220, such as mill operating data (e.g., throttle position, travel motor speed, distance to the end of the track/ladder.

In accordance with some disclosed aspects, the controller(s) (e.g., 1202 and/Or 1212, or 1222 and/or 1232) can be configurable with programmable setpoints. The powerhead throttle 1203 might be controlled via an RPM setpoint (e.g., in controller 1202 or 1222) set by the operator (e.g., via user interface 1220), pre-programmed, and/or might be configurable via the at least one processor 1230 based on at least one other sensor input (e.g., belt tension, end of run, and/or other sensor inputs disclosed herein) and/or at least one control output (e.g., travel motor speed).

In one instance, a belt tension setpoint might be programmatically configurable based on an operating condition, such as powerhead throttle position. For example, the belt tension setpoint might be increased as throttle is decreased. A setpoint might be constant for a range of operating conditions, or might vary continuously as the operating condition(s) change. In one example, a first setpoint might depend on a second setpoint's value, the value of the first setpoint being updated when the second setpoint's value changes by a predetermined amount.

In some instances, a multivariate control scheme might be employed by the controller(s). By way of example, but without limitation, a setpoint can comprise a function of a plurality of factors, each factor comprising a sensor input, another setpoint's value, or an operating condition. A similar process variable can be provisioned. In some instances, conditional logic comprising multiple setpoints might be employed, including AND, OR, NOT, and/or combinations thereof. In one example, when a measured tension reaches the tension setpoint, the measured RPM reaches an RPM setpoint, and throttle position is less than a predetermined value, the tension setpoint might be increased.

Disclosed aspects can provide for direct or indirect coupling between different control operations. For example, an increase in belt tension can cause RPMs of the powerhead to decrease. While the powerhead controller 1202 might not receive data from the belt tension sensor 1211, the RPM sensor 1201 provides the requisite information for controlling 1202 the powerhead throttle 1203, so the controller 1202 is indirectly responsive to the belt tension. As the belt tension increases, the controller 1202 increases the throttle 1203 to increase the RPM process variable to the RPM setpoint. In order to avoid undesirable coupling between the controllers 1202 and 1212, such as oscillations or driving the control function to its maximum or minimum, a decoupling mechanism might be employed by one or both controllers 1202 and 1212. In one example, when the microprocessor 1210 detects that the throttle position has reached a predetermined threshold value, the microprocessor 1210 can reduce the belt tension setpoint in controller 1212.

The microprocessor 1210 (or processor 1230) can be configurable to adapt at least one of the controller 1202 and 1212 (or control logic 1222 and 1232) setpoints for different operating conditions, such as might be determined by cut width, slab thickness, properties of the slab, incline or decline angle of the cutting plane, distance from the end of the cut, and the like. In some aspects, the microprocessor 1210 or processor 1230 can run an AI program to learn and/or adapt the control 1202 and/or 1212 (or 1222 and/or 1232) for the different operating conditions.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determine" encompasses a wide variety of actions. For example, "determine" may include calculate, compute, process, derive, investigate, look up (e.g., looking up in a table, a database or another data structure), ascertain, and the like. Also, "determine" may include receive (e.g., receive information), access (e.g., access data in a memory), and the like. Also, "determine" may include resolve, select, choose, establish, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. In the case of a hand-held controller (see FIG. 7), a user interface (e.g., keypad, display, mouse, joystick, etc.) may be communicatively connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A chainsaw mill, comprising:
   a chainsaw, comprising:
      a chainsaw bar to guide a cutting chain; and
      at least one powerhead to drive the cutting chain, the at least one powerhead comprising at least one throttle;
   a guide track comprising two ends, and a drive belt attached at the two ends;
   a gantry configured to hold the chainsaw and configured to transit along the guide track;
   a travel motor attached to the gantry and configured to engage with the drive belt for driving the gantry along the guide track; and
   a control system configured to automate control of the at least one powerhead and the travel motor by keeping drive-belt tension and powerhead revolutions per minute (RPM) within predetermined specifications.

2. The chainsaw mill recited in claim 1, wherein the predetermined specifications comprises a range of drive-belt tension and a range of powerhead RPM.

3. The chainsaw mill recited in claim 1, wherein the predetermined specifications comprises a proximity to a drive-belt tension setpoint and a proximity to an RPM setpoint.

4. The chainsaw mill recited in claim 1, wherein the control system is further configured to couple control of the travel motor with control of the at least one powerhead.

5. The chainsaw mill recited in claim 1, wherein the control system is further configured to damp effects of at least one of travel motor control on powerhead control or powerhead control on travel motor control.

6. The chainsaw mill recited in claim 1, further comprising at least one tension sensor communicatively coupled to the control system and configured to provide a drive-belt tension measurement to the control system; and at least one RPM sensor communicatively coupled to the control system and configured to provide an RPM measurement to the control system.

7. The chainsaw mill recited in claim 1, wherein the control system comprises at least one proportional-integral-derivative controller.

8. A control system for a chainsaw mill that comprises at least one powerhead and at least one travel motor configured to mechanically engage with a drive belt to drive the at least one powerhead along a guide track, the control system comprising:
   at least one tension sensor configured to produce a tension measurement of tension on the drive belt;
   at least one powerhead sensor configured to produce a revolutions per minute (RPM) measurement of the at least one powerhead, or to produce a chain speed measurement of a cutting chain being driven by the at least one powerhead;
   a powerhead controller configured for, in response to the RPM measurement or the chain-speed measurement, controlling the powerhead's throttle to keep the RPM or the chain speed within a predetermined range; and a travel motor controller configured for, in response to the tension measurement, controlling the at least one powerhead's transit along the guide track to maintain drive-belt tension within a predetermined range.

9. The control system recited in claim 8, wherein controlling the powerhead's throttle to keep the RPM or the chain speed within a predetermined range comprises adjusting the powerhead's throttle to reduce a difference between the RPM measurement and an RPM setpoint.

10. The control system recited in claim 8, wherein controlling the at least one powerhead's transit along the guide track to maintain drive-belt tension within a predetermined range comprises adjusting the travel motor's drive force to reduce a difference between the tension measurement and a drive-belt tension setpoint.

11. The control system recited in claim 8, wherein the powerhead controller and the travel motor controller are communicatively coupled together and configured to couple control of the travel motor with control of the at least one powerhead.

12. The control system recited in claim 8, wherein the powerhead controller and the travel motor controller are configured to damp effects of at least one of travel motor control on powerhead control or powerhead control on travel motor control.

13. The control system recited in claim 8, wherein at least one of the powerhead controller and the travel motor controller comprises at least one proportional-integral-derivative controller.

14. An apparatus configured to operate with a chainsaw mill, comprising at least one processor and at least one memory in electronic communication with the at least one processor, the at least one memory having instructions stored therein and executable by the at least one processor for:
  receiving a tension measurement of tension on a drive belt resulting from a drive force exerted by a travel motor mechanically engaged with the drive belt and configured to drive at least one powerhead along a guide track;
  receiving a revolutions per minute (RPM) measurement of the at least one powerhead, or receive a chain speed measurement of a cutting chain being driven by the at least one powerhead;
  in response to the RPM measurement or the chain-speed measurement, controlling the at least one powerhead's throttle to keep the RPM or the chain speed within a predetermined range; and
  in response to the tension measurement, controlling a travel motor to control transit of the at least one powerhead along the guide track to maintain drive-belt tension within a predetermined range.

15. The apparatus recited in claim 14, wherein controlling the at least one powerhead's throttle to keep the RPM or the chain speed within a predetermined range comprises adjusting the at least one powerhead's throttle to reduce a difference between the RPM measurement and an RPM setpoint or adjusting the at least one powerhead's throttle to reduce a difference between the chain-speed measurement and a chain-speed setpoint.

16. The apparatus recited in claim 14, controlling the at least one powerhead's transit along the guide track to maintain drive-belt tension within a predetermined range comprises adjusting the travel motor's drive force to reduce a difference between the tension measurement and a drive-belt tension setpoint.

17. The apparatus recited in claim 14, wherein controlling the at least one powerhead's throttle is based on the tension measurement or controlling the travel motor is based on the tension measurement.

18. The apparatus recited in claim 14, further comprising at least one of damping effects of travel motor control on the at least one powerhead's throttle, damping effects of powerhead throttle control on travel motor control.

19. The apparatus recited in claim 14, further comprising instructions stored on the at least one memory and executable by the at least one processor to communicate with at least one tension sensor to receive the tension measurement and communicate with at least one RPM sensor to receive the RPM measurement.

20. The apparatus recited in claim 14, wherein controlling the at least one powerhead's throttle and controlling the travel motor employs at least one proportional-integral-derivative controller.

* * * * *